United States Patent
Utagawa

(10) Patent No.: US 6,563,538 B1
(45) Date of Patent: May 13, 2003

(54) INTERPOLATION DEVICE, PROCESS AND RECORDING MEDIUM ON WHICH INTERPOLATION PROCESSING PROGRAM IS RECORDED

(75) Inventor: Ken Utagawa, Yokohama (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 09/159,765

(22) Filed: Sep. 24, 1998

(30) Foreign Application Priority Data

Sep. 26, 1997 (JP) .............................. 9-261359
Oct. 27, 1997 (JP) .............................. 9-293912

(51) Int. Cl.⁷ ........................ H04N 5/335; H04N 1/46; G06K 9/32
(52) U.S. Cl. .................. 348/273; 348/280; 358/525; 382/300
(58) Field of Search ........................... 348/272, 273, 348/252, 266, 275, 280, 263; 358/512, 525; 382/162, 167, 274, 266, 199, 300

(56) References Cited

U.S. PATENT DOCUMENTS

| | | | |
|---|---|---|---|
| 5,373,322 A | * 12/1994 | Laroche et al. ............. | 348/272 |
| 5,382,976 A | * 1/1995 | Hibbard ..................... | 348/266 |
| 5,596,367 A | * 1/1997 | Hamilton et al. ............ | 348/266 |
| 5,629,734 A | * 5/1997 | Hamilton et al. ............ | 348/272 |
| 5,630,036 A | * 5/1997 | Sonohara et al. ........... | 382/162 |
| 5,652,621 A | * 7/1997 | Adams et al. .............. | 348/272 |
| 5,805,217 A | * 9/1998 | Lu et al. .................... | 348/266 |
| 5,852,468 A | * 12/1998 | Okada ...................... | 348/272 |
| 6,181,376 B1 | * 1/2001 | Rashkovskiy et al. ...... | 348/273 |
| 6,229,578 B1 | * 5/2001 | Acharya et al. ........... | 382/162 |
| 6,373,991 B1 | * 4/2002 | Shimazu et al. ............ | 382/266 |

OTHER PUBLICATIONS

Kuo, Kuo–Tang et al. "Fast Integrated Algorithm and Implementations for the Interpolation and Color Correction of CCD–Sensed Color Signals", 1998, IEEE, pp. 225–228.*

Sakamoto, Tadashi et al. "Software Pixel Interpolation for Digital Still Cameras Suitable for a 32–bit MCU", Nov., 1998, IEEE Transactions on Consumer Electronics, vol. 44, No. 4.*

* cited by examiner

*Primary Examiner*—Wendy R. Garber
*Assistant Examiner*—John M. Villecco
(74) *Attorney, Agent, or Firm*—Oliff & Berridge, PLC

(57) ABSTRACT

An interpolation device performs interpolation of an image in which grid points that output a predetermined color and empty grid points that do not output the predetermined color are arrayed in a checkered configuration. A recording medium stores an image interpolation processing program. A first similarity calculator calculates a first vertical direction similarity and a first horizontal direction similarity. A second similarity calculator calculates a second vertical direction similarity and a second horizontal direction similarity. A similarity calculator determines the similarity in the vertical direction of an empty grid point based on the first vertical similarity and the second horizontal similarity and determines the similarity in the horizontal direction of the empty grid point based on the first horizontal similarity and the second horizontal similarity. An interpolation amount calculator calculates an interpolation amount, by selecting the pixel output of grid point(s) positioned in a direction with a strong similarity, or by weight-adding the pixel outputs of the grid points positioned in the vertical direction and the horizontal direction, according to the similarities that are determined.

24 Claims, 30 Drawing Sheets

| | X=1 | X=2 | X=3 | X=4 | X=5 | X=6 | X=7 | | X=X_max |
|---|---|---|---|---|---|---|---|---|---|
| Y=1 | G(1,1) | G'(2,1) | G(3,1) | G'(4,1) | G(5,1) | G'(6,1) | G(7,1) | ⋯ | G'(X_max,1) |
| Y=2 | G'(1,2) | G(2,2) | G'(3,2) | G(4,2) | G'(5,2) | G(6,2) | G'(7,2) | • | • |
| Y=3 | G(1,3) | G'(2,3) | G(3,3) | G'(4,3) | G(5,3) | G'(6,3) | G(7,3) | • | • |
| Y=4 | G'(1,4) | G(2,4) | G'(3,4) | G(4,4) | G'(5,4) | G(6,4) | G'(7,4) | • | • |
| Y=5 | G(1,5) | G'(2,5) | G(3,5) | G'(4,5) | G(5,5) | G'(6,5) | G(7,5) | • | • |
| | ⋮ | • | • | • | • | • | • | | • |
| Y=Y_max | G'(1,Y_max) | • | • | • | • | • | • | | G'(X_max,Y_max) |

FIG.5

|  | k-3 | k-2 | k-1 | k | k+1 | k+2 | k+3 |
|---|---|---|---|---|---|---|---|
| p-3 |  | 1 | 1 |  |  | 0 |  |
| p-2 | 1 |  | 1 |  | 0 |  | 0 |
| p-1 |  | 1 |  | 1 |  | 0 |  |
| p | 1 |  | 1 | k,p | 0 |  | 0 |
| p+1 |  | 1 |  | 1 |  | 0 |  |
| p+2 | 0 |  | 0 |  | 0 |  | 0 |
| p+3 |  | 0 |  | 0 |  | 0 |  |

FIG.6A

|  | k-3 | k-2 | k-1 | k | k+1 | k+2 | k+3 |
|---|---|---|---|---|---|---|---|
| p-3 |  | 1 |  | 1 |  | 0.5 |  |
| p-2 | 1 |  | 1 |  | 0.5 |  | 0.5 |
| p-1 |  | 1 |  | 1 |  | 0.5 |  |
| p | 1 |  | 1 | k,p | 0.5 |  | 0.5 |
| p+1 |  | 1 |  | 1 |  | 0.5 |  |
| p+2 | 0 |  | 0 |  | 0 |  | 0 |
| p+3 |  | 0 |  | 0 |  | 0 |  |

FIG.6B

| G | R | G | R | G | R | G | R | G | R |
|---|---|---|---|---|---|---|---|---|---|
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |

FIG.16A
RELATED ART

| G |   | G |   | G |   | G |   | G |   |
|---|---|---|---|---|---|---|---|---|---|
|   | G |   | G |   | G |   | G |   | G |
| G |   | G |   | G |   | G |   | G |   |
|   | G |   | G |   | G |   | G |   | G |
| G |   | G |   | G |   | G |   | G |   |
|   | G |   | G |   | G |   | G |   | G |
| G |   | G |   | G |   | G |   | G |   |
|   | G |   | G |   | G |   | G |   | G |
| G |   | G |   | G |   | G |   | G |   |

| G11 | R12 | G13 | R14 | G15 | R16 | G17 | ... |
|-----|-----|-----|-----|-----|-----|-----|-----|
| B21 | G22 | B23 | G24 | B25 | G26 | B27 | ... |
| G31 | R32 | G33 | R34 | G35 | R36 | G37 | ... |
| B41 | G42 | B43 | G44 | B45 | G46 | B47 | ... |
| G51 | G52 | G53 | R54 | G55 | R56 | G57 | ... |
| B61 | G62 | B63 | G64 | B65 | G66 | B67 | ... |

FIG.18
RELATED ART

| G11=1 | R12=1 | G13=1 | R14=1 | G15=0 | R16=0 | G17=0 | ... |
|-------|-------|-------|-------|-------|-------|-------|-----|
| B21=1 | G22=1 | B23=1 | G24=1 | B25=0 | G26=0 | B27=0 | ... |
| G31=1 | R32=1 | G33=1 | R34=1 | G35=0 | R36=0 | G37=0 | ... |
| B41=1 | G42=1 | B43=1 | G44=1 | B45=0 | G46=0 | B47=0 | ... |
| G51=0 | G52=0 | G53=0 | R54=0 | G55=0 | R56=0 | G57=0 | ... |
| B61=0 | G62=0 | B63=0 | G64=0 | B65=0 | G66=0 | B67=0 | ... |

FIG.19
RELATED ART

|  | i−2 | i−1 | i | i+1 | i+2 |
|---|---|---|---|---|---|
| j−2 |  | G5 |  | G6 |  |
| j−1 | G12 |  | G1 |  | G7 |
| j |  | G4 | (i, j) | G2 |  |
| j+1 | G11 |  | G3 |  | G8 |
| j+2 |  | G10 |  | G9 |  |

INTERPOLATION DEVICE, PROCESS AND RECORDING MEDIUM ON WHICH INTERPOLATION PROCESSING PROGRAM IS RECORDED

INCORPORATION BY REFERENCE

The disclosures of the following priority applications are herein incorporated by reference: Japanese Patent Application No. 9-261359, filed Sep. 26, 1997 and Japanese Patent Application No. 9-293912, filed Oct. 27, 1997.

BACKGROUND OF THE INVENTION

1. Field of Invention

The present invention relates to an interpolation device and process that perform interpolation of an image in which grid points that output a predetermined color and empty grid points that do not output the color are arrayed in a checkered configuration, and to a recording medium in which an interpolation processing program for use with such an image is recorded.

2. Description of Related Art

There are electronic cameras that use a single imaging element to produce an image signal of a color image. An imaging element like this, for example, as shown in FIG. 16A, is structured with color filters of the three colors of RGB (red color, green color, blue color) arranged in a Bayer array.

Referring to the green color (G), it can be said that the imaging element is structured as an array having some grid points, which are pixels that output green color as shown in FIG. 16B, and other empty grid points, which are pixels that do not output green color. These grid points are arrayed in a checkered configuration.

Furthermore, when using a color filter having a structure in which two imaging elements comprising only green color (G) as shown in FIG. 17A are shifted relative to each other, as shown in FIG. 17B, it can be said that imaginary empty grid points that do not output green color, and grid points that output green color are structured so as to be arrayed in a checkered configuration.

Furthermore, when using a two-plate-type of color filter, one imaging element is formed by G only, and the other imaging element is structured such that pixels that output red color and pixels that output blue color are arrayed in a checkered configuration. That is, the pixels that output blue color become empty grid points with respect to red color, and the pixels that output red color become empty grid points with respect to blue color.

Conventionally, in methods that perform interpolation of the color image that corresponds to the image signals formed by such imaging elements, the average value of the image (pixel) output of the grid points adjacent to empty grid points is used as the pixel output (interpolation amount) of the empty grid points.

U.S. Pat. No. 5,373,322 discloses a process that estimates the directionality of the image output of the empty grid points by using chrominance gradients as a technique for interpolating parts of an image, such as edges, having a spatially strong directivity.

FIG. 18 illustrates a conventional interpolation process disclosed in U.S. Pat. No. 5,373,322. In FIG. 18, G11, G13, . . . , G66, and so forth, show the pixel output of green color (G), R12, R14, . . . , R56, and so forth, show the pixel output of red color (R), and B21, B23, . . . , B67, and so forth, show the pixel output of blue color (B). In U.S. Pat. No. 5,373,322, as described above, when the interpolation amount G34 of green color of the pixel that outputs R34 is calculated, the information HDiff related to the chrominance gradients in the horizontal direction is obtained as $$H\text{Diff} = |((R32+R36)/2) - R34|$$

and the information VDiff related to the chrominance gradients in the vertical direction is obtained as $$V\text{Diff} = |((R14+R54)/2) - R34|.$$

The calculation method of G34 varies from case to case, based upon the relationship between HDiff and VDiff, which were thus obtained. That is, in the case of HDiff<VDiff (when the correlation in the horizontal direction is strong), G34 is obtained by $$G34 = (G33+G35)/2$$

and in the case of VDiff<HDiff (when the correlation in the vertical direction is strong), G34 is obtained by $$G34 = (G24+G44)/2$$

and in the case of HDiff=VDiff, G34 is obtained by $$G34 = (G24+G44+G33+G35)/4.$$

That is, the information related to the chrominance gradients of green color is estimated in this prior art technique based upon the pixel output of red color irrespective of the process that obtains the interpolation amount of green color.

Estimating the spatial similarity of the empty grid points in order to accurately predict the interpolation amount of the empty grid points is effective. However, the information related to the chrominance gradients of green color is estimated in the prior art based upon the pixel output of red color irrespective of the process that obtains the interpolation amount of green color. Because of this, it was not possible to accurately estimate the directivity of the pixel output of green color based upon the pixel output of red color in an image in which the chrominance gradients of green color and the chrominance gradients of red color are not constant, or in an image in which the component of red color is low, or the like.

Furthermnore, the directivity of the pixel output of the empty grid points is not always symmetrically right and left or symmetrically up and down. Because of this, for reasons similar to the prior art described above, when the information related to the chrominance gradients was obtained in only the horizontal and vertical directions, it was difficult to accurately estimate the directivity of the appropriate pixel output.

For example, when each pixel output in FIG. 18 has the value shown in FIG. 19, G34 has a strong correlation in the vertical direction (particularly in the upper direction).

U.S. Pat. No. 5,373,322 uses the following calculations:

$$H\text{Diff} = |((R32+R36)/2) - R34|$$

$$V\text{Diff} = |((R14+R54)/2) - R34|$$

In this example, HDiff=VDiff is established, and it is estimated that the correlation in the vertical and horizontal directions is the same. In such a situation, where HDiff=VDiff=0.5, it is preferable for G34=1 to be satisfied. However, in this situation, since HDiff=VDiff:

$$G34 = (G24 + G44 + G33 + G35)/4$$
$$= 0.75$$

That is, G34=0.75, rather than G34=1. Thus, when the interpolation is performed based upon the directivity of the pixel output as conventionally estimated, there is a possibility of damaging the clearness of the image, or destroying the image, in the worst case. Because of this, there is a possibility that the sharpness and the smoothness of the border parts can be lost.

SUMMARY OF THE INVENTION

Thus, one object of the invention is to provide an interpolation device and process that estimates the spatial directivity of empty grid points in detail, and accurately obtains the interpolation amount of the empty grid points.

Another object of the invention is to provide a recording medium on which is recorded an interpolation processing program that estimates the spatial directivity of the empty grid points in detail and that accurately obtains the interpolation amount of the empty grid points.

An interpolation device according to one aspect of the invention performs interpolation of an image having grid points that output a predetermined color and at least one empty grid point that does not output the predetermined color, the grid points being oriented in a checkered configuration, and obtains an interpolation amount that becomes a pixel output of the empty grid point. A correlation amount calculator determines a correlation between individual pixel outputs of at least two grid points adjacent to the empty grid point and pixel outputs of each one of grid points oriented in shifted positions in the four directions of upper, lower, right, and left directions, respectively, with respect to the at least two grid points, and calculates a correlation amount showing the correlation strength in each direction. A similar direction detector identifies a direction having a strong correlation amount based upon the correlation amount for each direction calculated by the correlation amount calculator. An interpolation amount calculator determines an interpolation amount of the empty grid point based upon a pixel output of at least one grid point in a direction where correlation discerned by the similar direction detector is strong.

An interpolation device according to another aspect of the invention performs interpolation of an image having grid points that output a predetermined color and at least one empty grid point that does not output the predetermined color, the grid points being oriented in a checkered configuration, and obtains an interpolation amount that becomes a pixel output of the empty grid point. A correlation amount calculator determines a correlation between individual pixel outputs of at least two grid points adjacent to the empty grid point and pixel outputs of each one of grid points oriented in shifted positions in the four directions of upper, lower, right, and left directions, respectively, with respect to the at least two grid points. A weighting factor calculator calculates a weighting factor for each direction based upon the correlation amount for each direction calculated by the correlation amount calculator. An interpolation amount calculator calculates the product of the weighting factor for each direction calculated by the weighting factor calculator and the pixel outputs of grid points corresponding to each weighting factor, and assigns a sum of those products as an interpolation amount of the empty grid point.

According to another aspect of the invention, an interpolation device includes a first similarity calculator that calculates a first vertical direction similarity indicative of a similarity of two grid points that are adjacent in a vertical direction to an empty grid point and a first horizontal direction similarity indicative of a similarity of two grid points that are adjacent in a horizontal direction to the empty grid point. A second similarity calculator calculates a second vertical direction similarity indicative of a similarity of at least one of the grid points that are adjacent in a horizontal direction to the empty grid point and a second horizontal direction similarity indicative of a similarity of at least one of the grid points that are adjacent in a vertical direction to the empty grid point. A similarity detector calculates a similarity in a vertical direction of the empty grid point based on the first vertical direction similarity and the second vertical direction similarity and determines a similarity in a horizontal direction of the empty grid point based on the first horizontal direction similarity and the second horizontal direction similarity. An interpolation calculator calculates an interpolation amount of the empty grid point by selecting at least one pixel output of the grid points that are positioned in a direction where the similarity is strong according to the similarity determined by the similarity detector or by weighted addition of at least one pixel output of the grid points that are positioned in the vertical direction and at least one pixel output of the grid point positioned in the horizontal direction, according to the similarity.

The invention also relates to the processes performed by the interpolation device and to a recording medium, such as, for example, a CD-ROM or a carrier wave, that stores a computer readable program or data signal representative of the program to perform the interpolation process.

BRIEF DESCRIPTION OF THE DRAWINGS

The invention will be described in conjunction with the following drawings in which like reference numerals designate like elements and wherein:

FIG. 5 shows the pixel output of the grid points and the interpolation amount of the empty grid points;

FIGS. 6A–6B show examples of the pixel outputs of the grid points;

FIGS. 16A–16B show one possible structure of an imaging element;

FIGS. 17A–17B show another possible structure of an imaging element;

FIG. 18 explains conventional interpolation processing;

FIG. 19 explains an example of pixel outputs;

FIG. 22 shows an empty grid point and pixel outputs of other grid points;

DETAILED DESCRIPTION OF PREFERRED EMBODIMENTS

Hereafter, preferred embodiments are explained with reference to the drawings. The embodiments are described with reference to an electronic (digital) still camera in which the interpolation device concerning the invention is adopted. The invention is applicable to devices other than still cameras, such as, for example, moving image cameras and imaging devices (e.g., scanners) in general.

Figure 2:
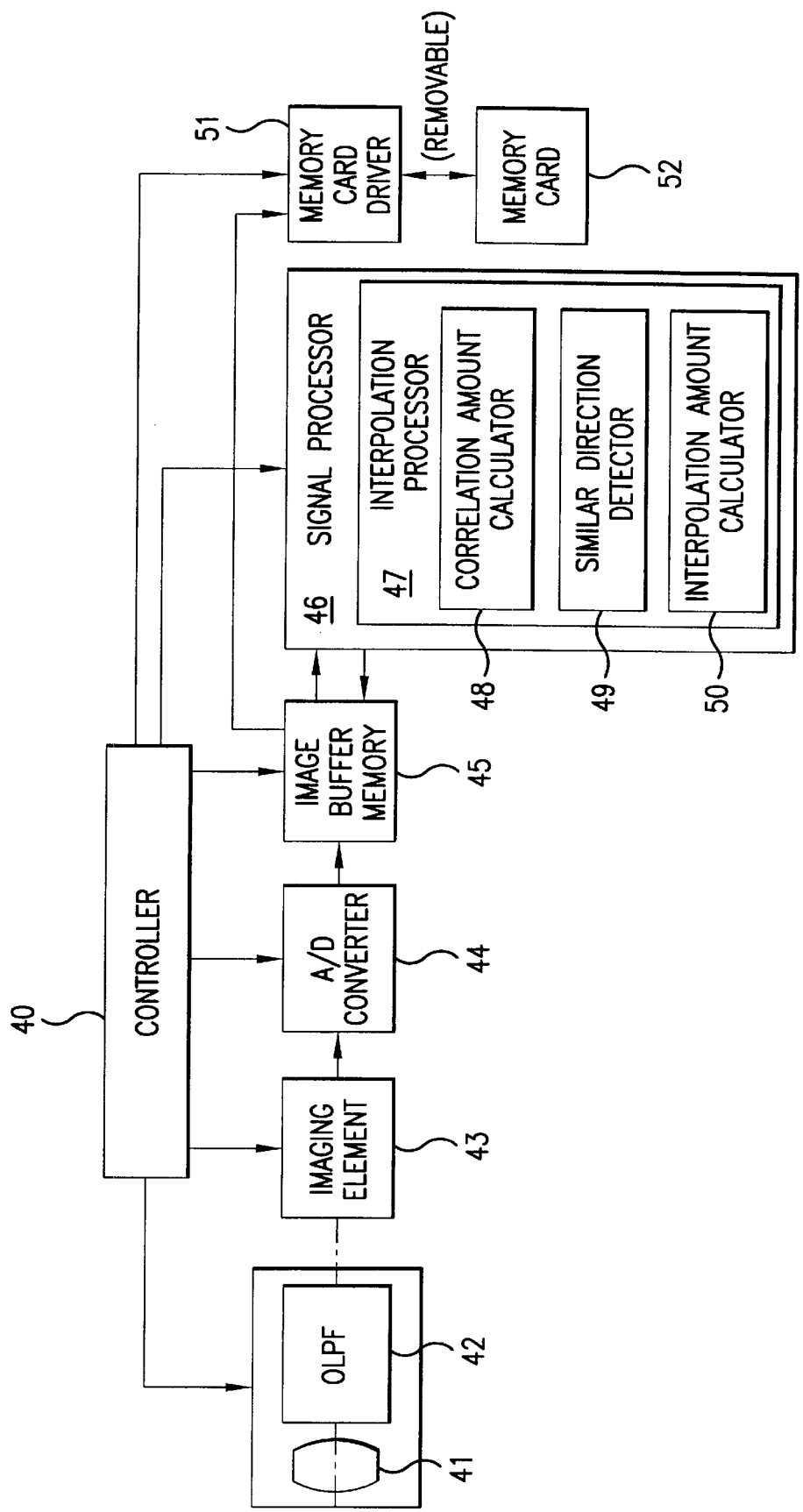
FIG. 2 is a block diagram of a first embodiment of the invention.

FIG. 2 is a block diagram of the first embodiment. In FIG. 2, the output of a controller 40 is connected to a shooting optical system 41, an OLPF (Optical Low Pass Filter) 42, an imaging element 43, an A/D converter 44, an image buffer memory 45, a signal processor 46, and a memory card driver 51. The signal processor 46 includes an interpolation processor 47, which is composed of a correlation amount calculator 48, a similar direction detector 49 and an interpolation amount calculator 50.

The imaging element 43 can be, for example, a two-dimensional Charge-Coupled-Device (CCD). Imaging element 43 can alternatively include, for example, a PSD (Photo-Sensitive-Diode) or a CMOS device.

In addition, the imaging element 43, as shown in FIG. 16A, includes a three-colored (RGB) color filter, which is Bayer-arranged. The image buffer memory 45 is composed by three areas that correspond to these three colors.

The optical image obtained at the shooting optical system 41 is filtered by the OLPF 42, and is given to the imaging element 43. The output of the imaging element 43 is connected to the A/D converter 44. The output of the A/D converter 44 is connected to the image buffer memory 45. The output of the image buffer memory 45 is connected to the signal processor 46 and to the memory card driver 51.

The output of the signal processor 46 is connected to the image buffer memory 45, and to the memory card 52 when it is loaded in the memory card driver 51.

Figure 3:
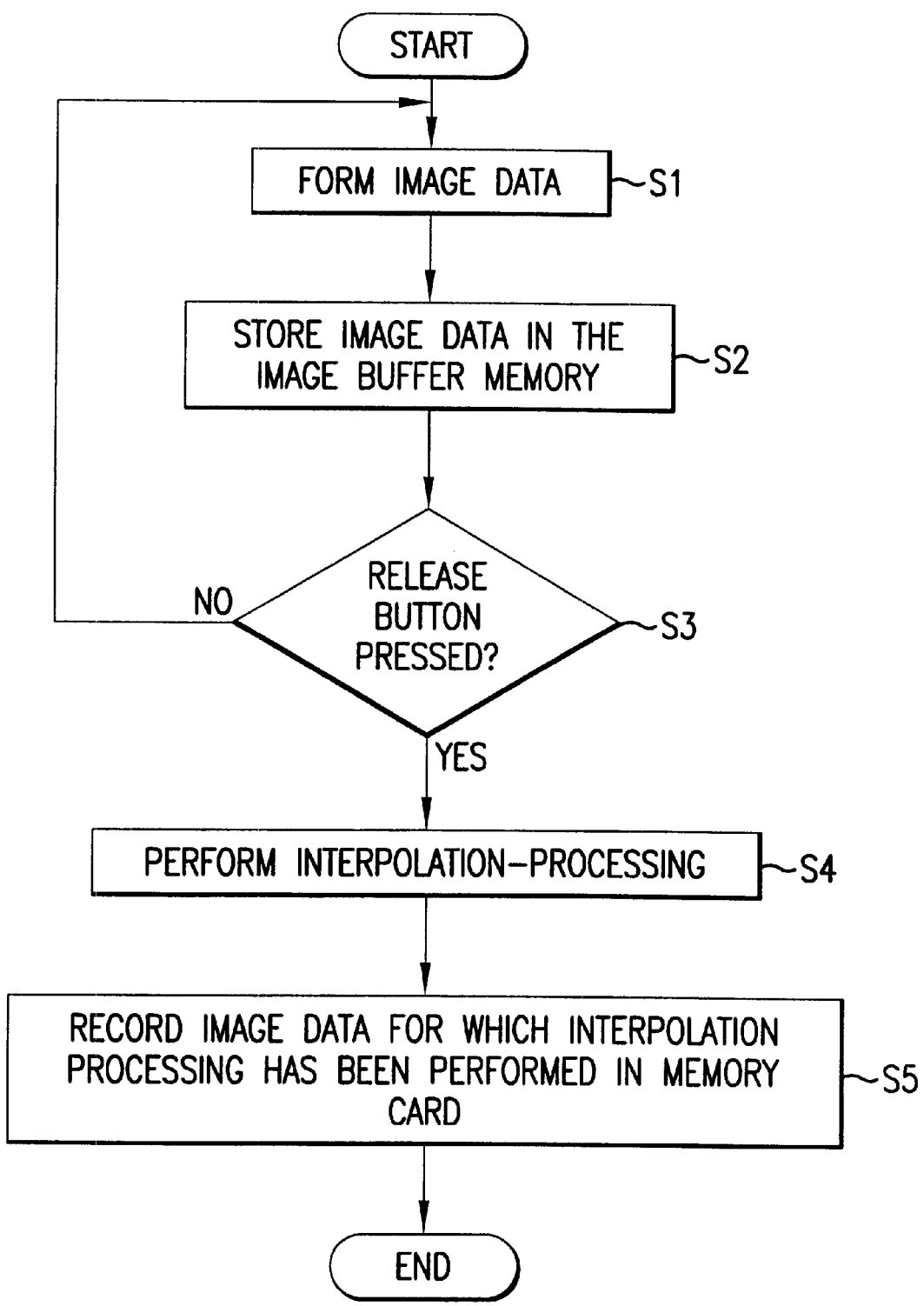
FIG. 3 is an operational flow chart of the first embodiment.
Figure 4:
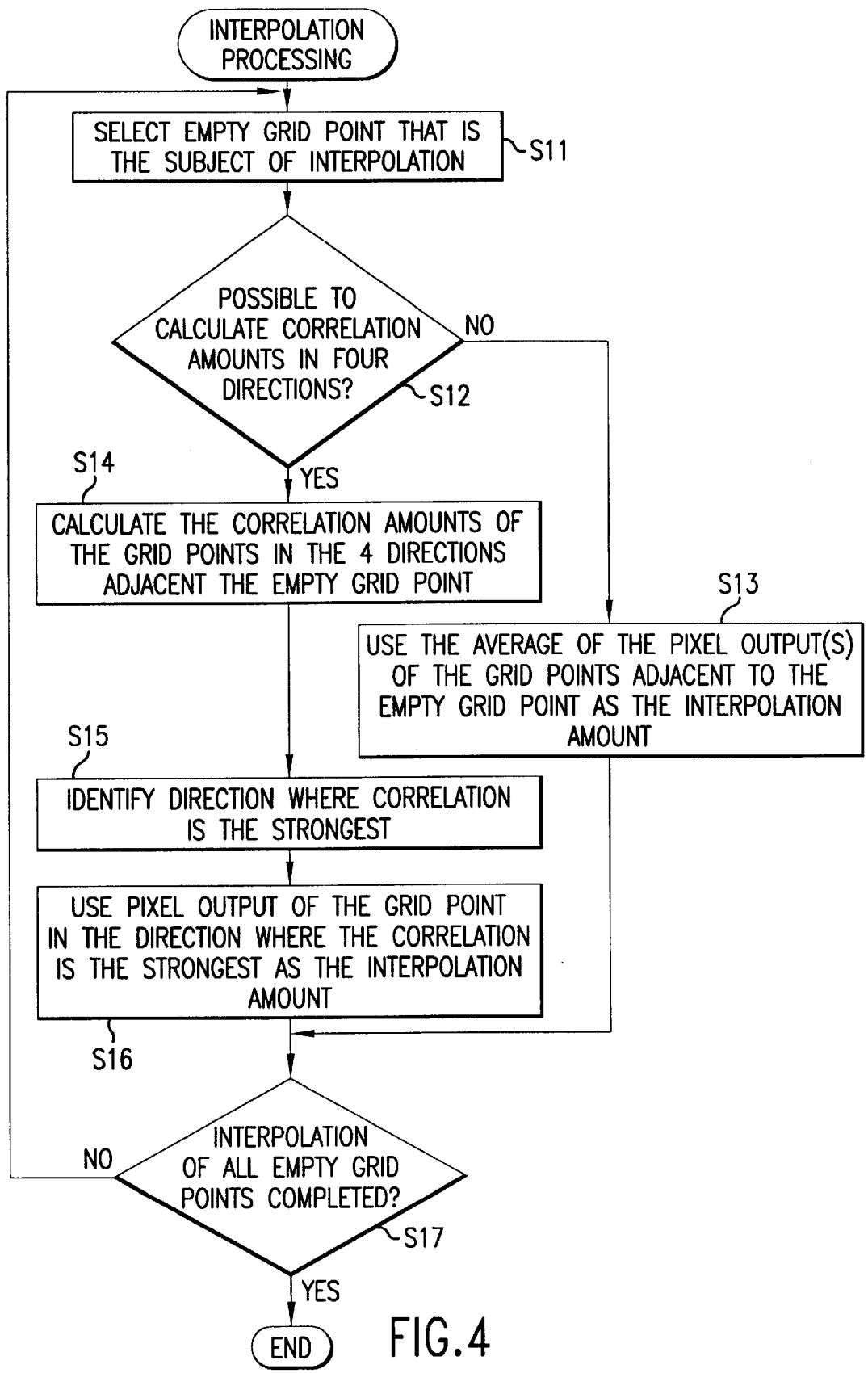
FIG. 4 is an operational flow chart of the interpolation processing of the first embodiment.

FIG. 3 is an operational flow chart of the first embodiment. FIG. 4 is an operational flow chart of the interpolation processing of the first embodiment. In the examples described for the present embodiment and for each later mentioned embodiment, the pixels that output green are grid points, and the pixels that output red or blue are empty grid points (empty with respect to green). In other words, the interpolation processing in the examples for the present embodiment and each later-mentioned embodiment corresponds to the processing performed to obtain the interpolation amount that corresponds to the green pixel output of these empty grid points.

In order to simplify the later explanation, the position of each pixel of the imaging element 43 is indicated by a coordinate system composed of a horizontal axis X in which the right direction is positive and a vertical axis Y in which the downward direction is positive. In addition, the pixel output of a grid point is indicated by G(x, y) and the interpolated amount of an empty grid point is indicated by G'(x, y).

FIG. 5 shows this kind of pixel output of the grid points and the interpolated amount of the empty grid points. In FIG. 5, X_max represents the maximum value of the X component, and Y_max represents the maximum value of the Y component.

Hereafter, the operation of the first embodiment is explained with reference to FIG. 2 through FIG. 5.

When the main power is turned on, the optical image provided via the shooting optical system 41 and the OLPF 42 forms an image on the optical converting surface (not shown) of the imaging element 43, and signal charges are formed by photoelectric conversion. The imaging element 43 forms the image signal by scanning the signal charges, and sends it to the A/D converter 44.

The A/D converter 44 forms the image data by converting the image signal provided in this manner (step S1). In the present embodiment and each later-mentioned embodiment, the image data corresponds to the pixel outputs of the imaging element 43. Such image data is divided into three colors of RGB, and stored in areas in the buffer memory 45 which correspond to each color (step S2). This kind of image data formation (step S1) and processing and storing (step S2) are repeatedly performed based on the timing control by the controller 40.

The area in the image buffer memory 45 that corresponds to green includes an area that stores the green image data (corresponding to the pixel output of the grid points) formed by the A/D converter 44 and an area that stores the green image data (corresponding to the interpolation amount of the empty grid points) obtained by the later-mentioned interpolation processing. These green image data (pixel outputs of the grid points and the interpolation amount of the empty grid points), as shown in FIG. 5, are stored in correlation with coordinates that are indicated by the abovementioned X-Y coordinate system.

The controller 40 evaluates whether the release button (not shown), which is provided in the main body of the electronic still camera, is pressed (step S3). When the controller 40 recognizes that the release button is not pressed, it repeatedly performs step S1 and step S2 at the above-mentioned timing. When the controller 40 recognizes that the release button is pressed, the later-mentioned execution of the interpolation processing by the interpolation processor 47 in the signal processor 46 is designated (step S4). In other words, in the present embodiment, the image data stored in the image buffer memory 45 becomes the object of the interpolation processing when the release button is pressed.

In addition, for performing the image display, it is also acceptable to constantly perform the interpolation processing without regard to when the release button is pressed. In addition, it is also acceptable to repeatedly perform the processing of step S1 and the subsequent steps after release occurs.

The controller 40 records the image data for which the interpolation processing is performed and that is stored in the image buffer memory 45 to the memory card 52 via the memory card driver 51 when the interpolation processing is completed (step S5).

Hereafter, the operation of the interpolation processing is explained. The interpolation processor 47 selects an empty grid point which is to be interpolated when the execution of the interpolation processing is indicated by the controller 40 (step S11). For example, in FIG. 5, when [k+p=odd number] is established for the arbitrary coordinates (k, p), an empty grid point corresponds to these coordinates. Because of this relationship, in the present embodiment, the coordinates that correspond to each pixel are retrieved in order from (1, 1) to (X_max, Y_max), and the coordinates for which the sum of the X element and Y element is an odd number are made to be empty grid points. (Of course, other relationships are possible, and other techniques can be used to determine whether a grid point is an empty grid point for which interpolation is needed.)

When the correlation amounts in the later-mentioned four different directions are calculated, it is desirable that at least three grid points exist in each of the four directions of upper, lower, left and right of the empty grid point. For example, an evaluation of whether the correlation amounts of four different directions are possible corresponds to an evaluation of whether [4≦k≦X_max−3] and [4≦p≦Y_max−3] are established for the arbitrary coordinates (k, p). The interpolation processor 47, by performing this kind of evaluation, evaluates whether calculation of the correlation amounts in the four directions is possible based on the coordinates of the selected empty grid point (step S12).

When the interpolation processor 47 determines that calculation of the correlation amounts in the four directions is impossible by performing this kind of evaluation, it takes the average value of the pixel outputs of the grid points that are adjacent to the empty grid point as the interpolation amount (step S13).

When the interpolation processor 47 determines that calculation of the correlation amounts in the four directions is possible, it activates the correlation calculator 48, the similar direction detector 49 and the interpolation amount calculator 50.

The correlation calculator 48, for the coordinates (k, p) of the empty grid point calculates the correlation amounts, C-up, C-down, C-left and C-right that correspond to the four directions of up, down, left and right as follows:

$$C\text{-}up = |G(k, p-1) - G(k, p-1-n)| \cdot tu1 +$$
$$|G(k, p+1) - G(k, p+1-n)| \cdot tu2 +$$
$$|G(k-1, p) - G(k-1, p-n)| \cdot tu3 +$$
$$|G(k+1, p) - G(k+1, p-n)| \cdot tu4$$

-continued $$C\text{-}down = |G(k, p-1) - G(k, p-1+n)| \cdot td1 +$$
$$|G(k, p+1) - G(k, p+1+n)| \cdot td2 +$$
$$|G(k-1, p) - G(k-1, p+n)| \cdot td3 +$$
$$|G(k+1, p) - G(k+1, p+n)| \cdot td4$$

$$C\text{-}left = |G(k, p-1) - G(k-n, p-1)| \cdot tl1 +$$
$$|G(k, p+1) - G(k-n, p+1)| \cdot tl2 +$$
$$|G(k-1, p) - G(k-1-n, p)| \cdot tl3 +$$
$$|G(k+1, p) - G(k+1-n, p)| \cdot tl4$$

$$C\text{-}right = |G(k, p-1) - G(k+n, p-1)| \cdot tr1 +$$
$$|G(k, p+1) - G(k+n, p+1)| \cdot tr2 +$$
$$|G(k-1, p) - G(k-1+n, p)| \cdot tr3 +$$
$$|G(k+1, p) - G(k+1+n, p)| \cdot tr4$$

(Step S14).

In the present embodiment, the correlation amounts C-up, C-down, C-left and C-right that correspond to the four directions of up, down, left and right are calculated with tu1–tu4, td1–td4, tl1–tl4 and tr1–tr4 having the value 1.

Figure 1A:
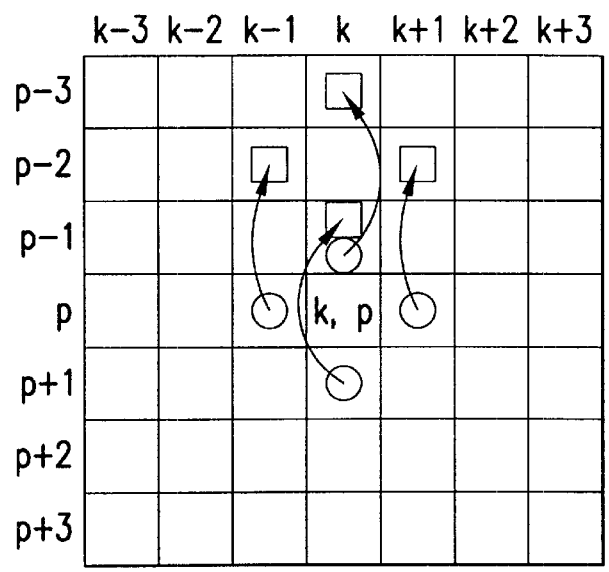
FIGS. 1A–1C explain one calculation method of the correlation amount according to an aspect of the invention.

Here, when n=2, the correlation amount C-up of the upper direction corresponds to the total sum of the absolute values of the differences between the pixel outputs of the four grid points that are indicated as ○ and the four grid points that are indicated as □ as shown in FIG. 1A.

The similar direction detector 49 identifies the direction having the strongest correlation by selecting the smallest value (while accepting overlap) among the correlation amounts C-up, C-down, C-left and C-right that are calculated by the correlation calculator 48 (step S15).

The interpolation amount calculator 50 then takes the pixel output of the grid point in the direction of the strongest correlation among the pixel outputs (G(k, p−1), G(k, p+1), G(k−1, p), G(k+1, p)) of the grid points that are adjacent to the empty grid point as the interpolation amount (step S16).

For example, when the correlation in the upper direction is strong, G'(k, p) is G(k, p−1). When the correlation in the lower direction is strong, G'(k, p) is G(k, p+1). When the correlation in the left direction is strong, G'(k, p) is G(k−1, p). When the correlation in the right direction is strong, G'(k, p) is G(k+1, p). When there are a plurality of directions having strong correlation, it is appropriate to use the average value of the pixel outputs of the grid points of these directions as the interpolation amount of the empty grid point.

When the interpolation amount of an empty grid point is thus determined, the interpolation processor 47 determines whether the interpolation processing of all the empty grid points is completed (step S17). For example, this kind of evaluation corresponds to determining whether [k>X_max−3] and [p>Y_max−3] are satisfied for the arbitrary coordinates (k, p) in the process of retrieving the coordinates that correspond to each pixel as mentioned above. The interpolation processor 47 repeatedly performs the above-mentioned processing (the processing of step S11 and after) until the interpolation processing of all the empty grid points is completed (YES in step S17).

Thus, in the present embodiment, the spatial directivity for an empty grid point in the four directions of up, down, left and right can be estimated, and the pixel output of the grid points that are adjacent in the direction which has the strongest directivity becomes the interpolation amount of the empty grid point. Moreover, this kind of estimation of the directivity is performed based on the directivity of the color (pixel output of the grid points) in which the interpolation processing is being performed.

Accordingly, according to the present embodiment, the spatial directivity of empty grid points can be estimated in detail and accurately. In addition, when the directivity of one direction is extremely strong, the accuracy of the interpolation processing can be reliably improved. For example, when the pixel outputs of the grid points in FIG. 1A are the values which are shown in FIG. 6A, C-up=0, C-down=2, C-left=1 and C-right=3. Alternatively, when the pixel outputs of the grid points in FIG. 1A are the values shown in FIG. 6B, C-up=0, C-down=2.5, C-left=0.5 and C-right=1.5. In either case, the fact that the correlation of the upper direction is the strongest is identified in FIG. 6A and FIG. 6B, and G'(k, p)=G(k, p−1)=1.

The correlation amounts of the vertical direction and the horizontal direction with respect to the empty grid point can be obtained based on the red color gradient as disclosed in U.S. Pat. No. 5,373,322. However, it can be obtained based on the pixel outputs of the grid points by using the correlation amounts of C-up, C-down, C-left and C-right that correspond to the four directions of up, down, left and right.

Here, when the correlation amount in the vertical direction is C-up+C-down, and the correlation amount in the horizontal direction is C-left+C-right, if the pixel outputs of the grid points are the values shown in FIG. 6A, C-up+C-down=2 and C-left+C-right=4, and the fact that the correlation in the vertical direction is strong can be estimated. Therefore, the interpolation amounts of the empty grid points can be obtained. However, when the pixel outputs of the grid points are the values shown in FIG. 6B, with the process of U.S. Pat. No. 5,373,322, even when the correlation in the vertical direction is strong, C-up+C-down=2.5 and C-left+C-right=2, and the correlation in the horizontal direction becomes strong. Therefore, it is possible that the image will degenerate through the interpolation.

In other words, in the present embodiment, high-accuracy interpolation can be performed with respect to an image that has a possibility of deterioration through interpolation by the correlation amounts of the vertical direction and the horizontal direction.

In addition, in the present embodiment, when it is recognized that the calculation of the correlations of four directions is impossible, the average value of the pixel outputs of the grid points that are adjacent to the empty grid point is the interpolation amount. However, when at least two directions exist in which the calculation of the correlation amount is possible, it is also acceptable to obtain this kind of correlation amount by the above-mentioned equations, and to obtain the interpolation amounts of the empty grid point based on the pixel output of the grid a point that is adjacent in the direction having the strong correlation. For example, in FIG. 5, when G'(2, 3) is calculated, the correlation amounts C-down and C-right of the lower direction and the right direction can be obtained as follows:

$$C\text{-}down = |G(2, 2) - G(2, 4)| +$$
$$|G(2, 4) - G(2, 6)| +$$
$$|G(1, 3) - G(1, 5)| +$$
$$|G(3, 3) - G(3, 5)|$$

-continued $$C\text{-}right = |G(2, 2) - G(4, 2)| +$$
$$|G(2, 4) - G(4, 4)| +$$
$$|G(1, 3) - G(3, 3)| +$$
$$|G(3, 3) - G(5, 3)|.$$

The results can then be used to determine which of the two directions (down and right) has the strongest correlation.

Figure 7:
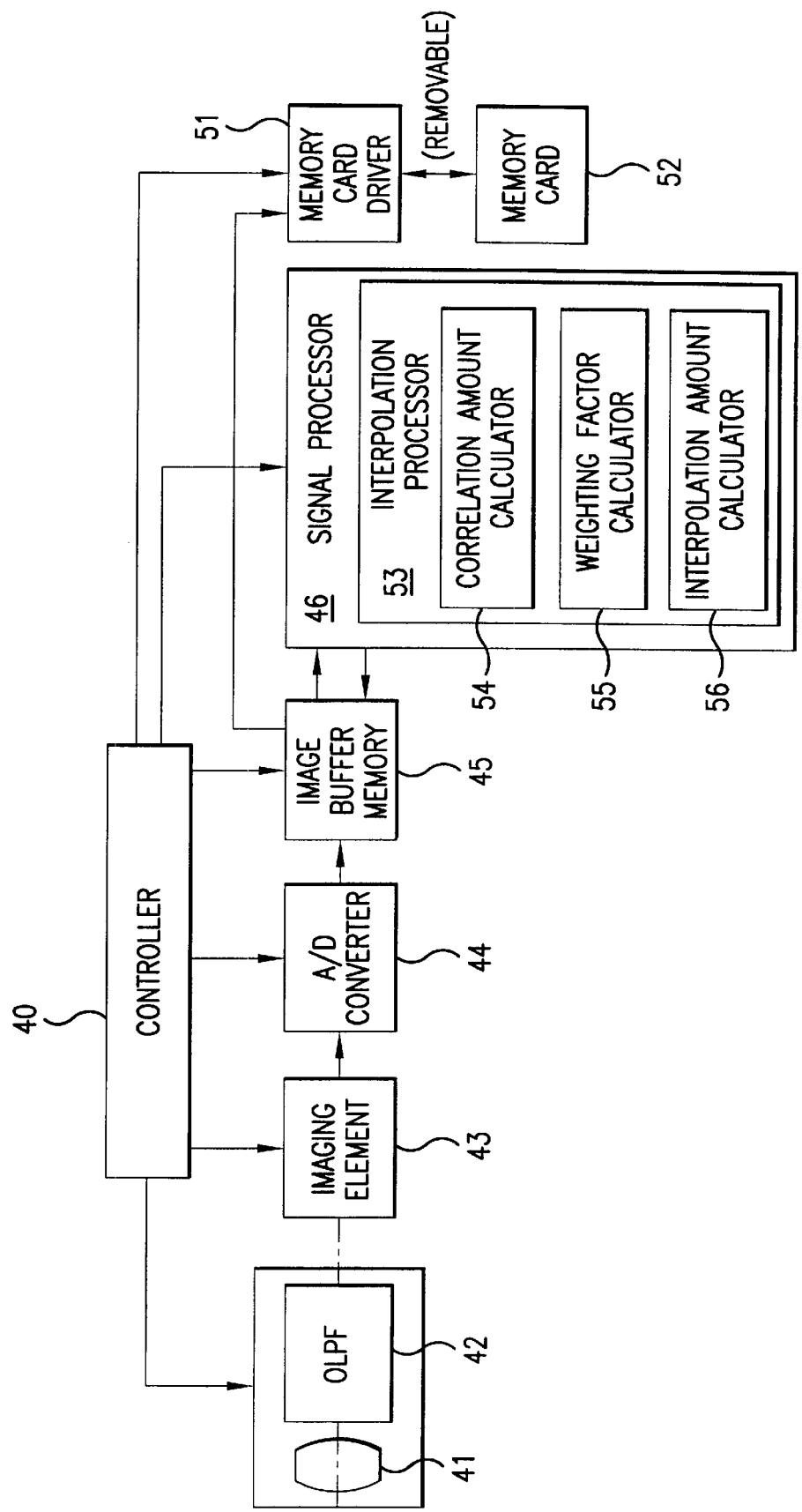
FIG. 7 is a block diagram of second, third, and fourth embodiments of the invention.

FIG. 7 is a block diagram relating to second, third and fourth embodiments of the invention. In FIG. 7, devices that function the same as devices in the block diagram of the first embodiment shown in FIG. 2 are shown with the same symbols, and the explanation of such structure is omitted. The differences between the second, third and fourth embodiments and the first embodiment are that the interpolation processor 53 is provided instead of the interpolation processor 47. The interpolation processor 53 includes a correlation amount calculator 54, a weighting factor calculator 55 and an interpolation amount calculator 56.

Figure 8:
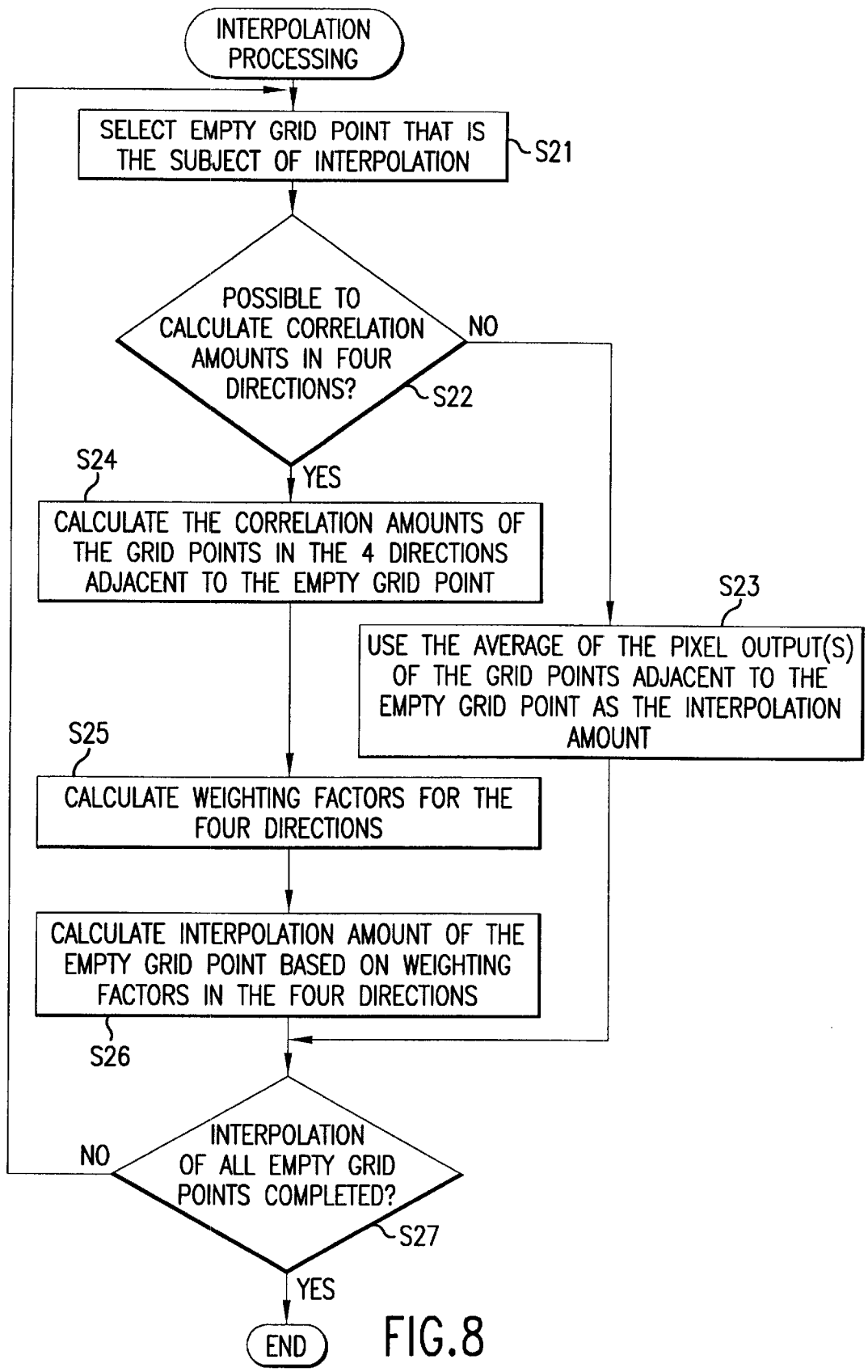
FIG. 8 is an operational flow chart of the interpolation processing of the second, third, and fourth embodiments.

FIG. 8 is an operational flow chart of the interpolation processing of the second, third and fourth embodiments. Hereafter, the operation of the second embodiment is explained with reference to FIG. 7 and FIG. 8. The different characteristics of the present embodiment lie in the operation of the interpolation processing. Therefore, the explanations of other operations are omitted since they are the same as in the first embodiment.

When the controller 40 recognizes that the release button is pressed, it designates the execution of the interpolation processing to the interpolation processor 53 within the signal processor 46. The interpolation processor 53, when thus instructed, selects the empty grid point which is to be the object of the interpolation processing, just like in the first embodiment (step S21).

In the second-fourth embodiments, when the correlation amounts of the later mentioned four directions are calculated, it is desirable that at least two pixels exist in the four directions of upper, lower, left and right of the empty grid point. For example, the evaluation of whether the calculations of the correlation amounts in four directions are possible corresponds to an evaluation of whether [3≦k≦X_max−2] and [3≦p≦Y_max−2] are established. The interpolation processor 53, by performing this kind of evaluation, evaluates whether the calculations of the correlation amounts in four directions is possible (step S22).

When the interpolation processor 53, by doing this kind of evaluation, recognizes that the calculations of the correlation amounts in the four directions are impossible, the average value of the pixel outputs of the grid points that are adjacent to the empty grid point becomes the interpolation amount (step S23). When the interpolation processor 53 recognizes that the calculations of the correlation amounts in the four directions are possible, it activates the correlation amount calculator 54, the weighting factor calculator 55 and the interpolation amount calculator 56.

The correlation amount calculator 54, for the coordinates (k, p) of the empty grid point, calculates the correlation amounts C-up, C-down, C-left and C-right that correspond to the four directions of up, down, left and right (step S24) as follows:

$$C\text{-}up = |G(k, p+1) - G(k, p+1-n)| +$$
$$|G(k-1, p) - G(k-1, p-n)| +$$
$$|G(k+1, p) - G(k+1, p-n)|$$

$$C\text{-}down = |G(k, p-1) - G(k, p-1+n)| +$$
$$|G(k-1, p) - G(k-1, p+n)| +$$
$$|G(k+1, p) - G(k+1, p+n)|$$

$$C\text{-}left = |G(k, p-1) - G(k-n, p-1)| +$$
$$|G(k, p+1) - G(k-n, p+1)| +$$
$$|G(k+1, p) - G(k+1-n, p)|$$

$$C\text{-}right = |G(k, p-1) - G(k+n, p-1)| +$$
$$|G(k, p+1) - G(k+n, p+1)| +$$
$$|G(k-1, p) - G(k-1+n, p)|$$

(Step S24).

Figure 1B:
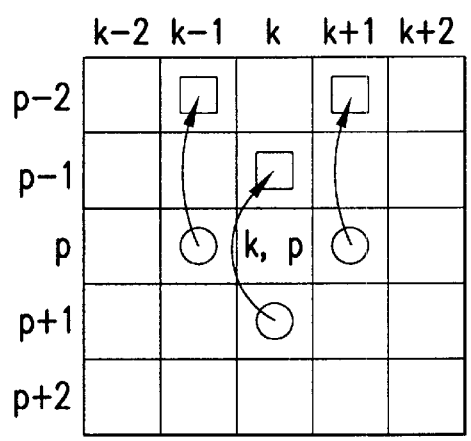
Figure 1C:
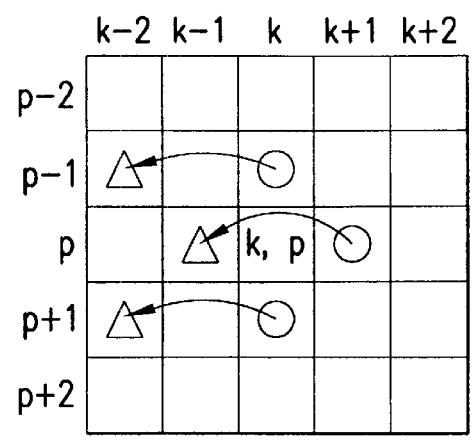

For example, when n=2, the correlation amount C-up in the upper direction is the sum of the absolute values of the differences between the pixel outputs of the three grid points that are indicated as ○ and the three grid points that are indicated as □ as shown in FIG. 1B. The correlation amount C-left in the left direction corresponds to the sum of the absolute values of the differences of the pixel outputs of the three grid points that are indicated as ○ and the pixel outputs of the three grid points that are indicated as Δ as shown in FIG. 1C. The correlation amount in the lower direction (or the right direction) corresponds to the sum of the absolute values of the differences between the pixel outputs of different combinations of three grid points that are adjacent to the empty grid point and the pixel outputs of grid points arranged in positions shifted from these grid points by 2 pixels in the lower direction (or the right direction).

Figure 9:
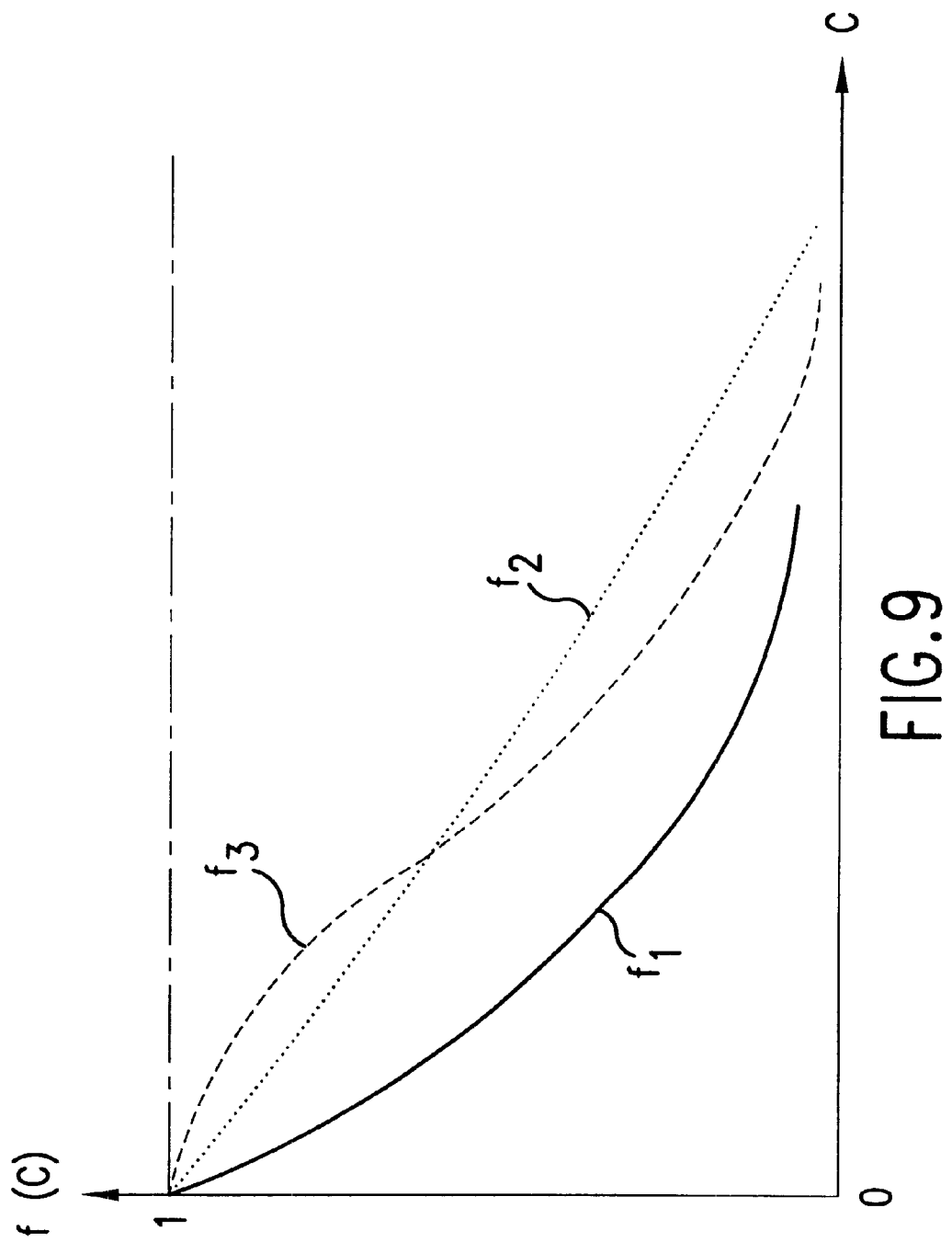
FIG. 9 is a chart showing the relationship between function f and variable c.
Figure 10A:
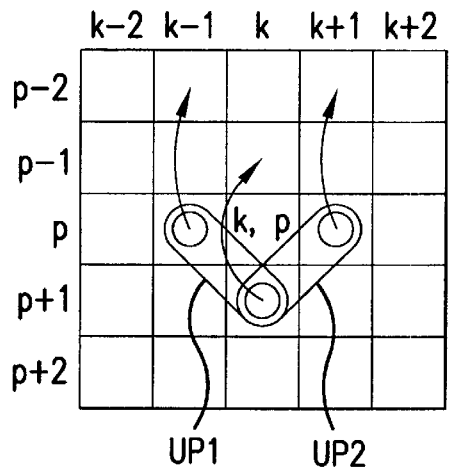
FIGS. 10A–10D explain the calculation method of the correlation amount according to an aspect of the invention.
Figure 10C:
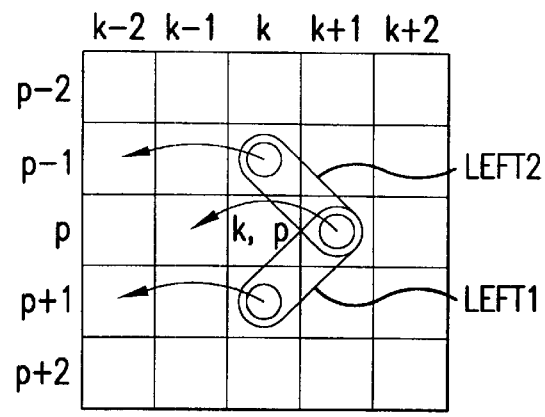
Figure 10B:
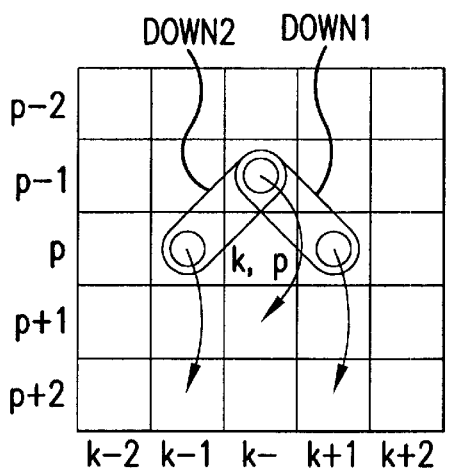
Figure 10D:
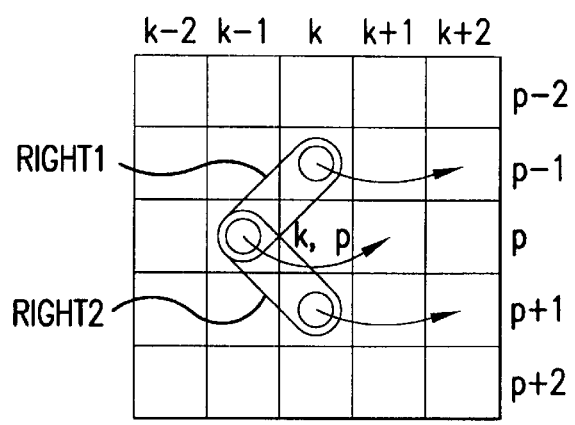

The weighting factor calculator 55, as shown in FIG. 9, for f(0)=1, and for the function f whose value approaches 0 in accordance with the increase of the variable number (according to the functions $f_1$, $f_2$ and $f_3$), calculates the weighting factors α-down, α-up, α-left and α-right that correspond to the four directions of up, down, left and right (step S25) as follows:

$$\alpha\text{-}up = f(C\text{-}up)/sf$$

$$\alpha\text{-}down = f(C\text{-}down)/sf$$

$$\alpha\text{-}left = f(C\text{-}left)/sf$$

$$\alpha\text{-}right = f(C\text{-}right)/sf.$$

Here, sf=f(C-up)+f(C-down)+f(C-left)+f(C-right).

For example, in the present embodiment, as one example of the function f, f(C)=1/(1+q×C). Here, q=⅓.

Thus, once the correlation amounts C-up, C-down, C-left and C-right are determined, weighting factors α-up, α-down, α-left and α-right can be determined based on the respective correlation amounts. Since the function used to determine the weighting factor has a value that decreases from 1 toward 0 as the input variable of the function increases, the weighting factor has a value of 1 when correlation is strong, and decreasing values as correlation weakens.

The interpolation amount calculator 56, for the weighting factors α-down, α-up, α-left and α-right that are calculated by the weighting factor calculator 55, calculates the interpolation amount G'(k, p) of the empty grid point as follows:

$$G'(k, p) = \alpha\text{-}up \times G(k, p-1) + \alpha\text{-}down \times G(k, p+1) + \alpha\text{-}left \times G(k-1, p) + \alpha\text{-}right \times G(k+1, p)$$

(Step S26).

When the interpolation amount of the empty grid point is thus determined, the interpolation processor 53 evaluates whether the interpolation processing of all the empty grid points is completed (step S27). For example, this kind of evaluation, in the process of searching for the coordinates that correspond to the above-mentioned empty grid points, is equivalent to the evaluation of whether [k>X_max-2] and [p>Y_max-2] are established for the arbitrary coordinates (k, p). The interpolation processor 53, by doing this kind of evaluation, repeatedly performs the above-mentioned processing (processing of step S21 and after) until it determines that the interpolation processing of all empty grid points is completed.

Thus, in the present embodiment, the spatial directivity of the empty grid points in the four directions of up, down, left and right can be estimated, and the weighting factor to be used when calculating the interpolation amounts can be obtained based on these directivities. Accordingly, in the present embodiment, when the spatial directivities of empty grid points are mutually related, since interpolation processing suitable to this kind of directivity can be reliably performed, the accuracy of the interpolation processing can be reliably improved.

Furthermore, in the present embodiment, when it is recognized that the calculation of the correlation amounts in the four directions is impossible, the average value of the pixel outputs of the grid points adjacent to the empty grid point is used as the interpolation amount. Alternatively, when one or more directions exist where the calculation of the correlation amounts is possible, it is also acceptable to obtain the interpolation amount of the empty grid point by obtaining the correlation amounts of these directions by the above-mentioned formula.

For example, in FIG. 5, when G'(2, 3) is calculated, the correlation amounts C-up, C-down, and C-right of the upper direction, the lower direction, and the right direction, respectively, can be obtained as follows:

$$C\text{-}up = |G(2, 4) - G(2, 2)| +$$
$$|G(1, 3) - G(1, 1)| +$$
$$|G(3, 3) - G(3, 1)|$$

$$C\text{-}down = |G(2, 2) - G(2, 4)| +$$
$$|G(1, 3) - G(1, 5)| +$$
$$|G(3, 3) - G(3, 5)|$$

$$C\text{-}right = |G(2, 2) - G(4, 2)| +$$
$$|G(2, 4) - G(4, 4)| +$$
$$|G(1, 3) - G(3, 3)|$$

FIGS. 10A–10D are diagrams explaining the method of calculating the correlation amounts in the third embodiment. The following explains the operation of the third embodiment. Furthermore, the different characteristics of the third embodiment lie in the operation of interpolation processing performed by the weighting factor calculator 55 and the interpolation amount calculator 56. As the other operations are the same as the second embodiment, the explanation thereof is omitted.

As shown in FIGS. 10A–10D, the correlation amount calculator 54 calculates the correlation amounts by dividing three grid points adjacent to the empty grid point into two pairs. For example, this is equivalent to up1 and up2 in FIG. 10A, left1 and left2 in FIG. 10B, down1 and down2 in FIG. 10C and right1 and right2 in FIG. 10D.

That is, with respect to the coordinates (k, p) of the empty grid point, the correlation amount calculator 54 calculates the correlation amounts C-up1, C-up2, C-down1, C-down2, C-left1, C-left2, C-right1, and C-right2 corresponding to the four directions of up, down, left and right of each pair as follows:

$$C\text{-}up1 = |G(k, p+1) - G(k, p+1-n)| + \\ |G(k-1, p) - G(k-1, p-n)|$$

$$C\text{-}up2 = |G(k, p+1) - G(k, p+1-n)| + \\ |G(k+1, p) - G(k+1, p-n)|$$

$$C\text{-}down1 = |G(k, p-1) - G(k, p-1+n)| + \\ |G(k+1, p) - G(k+1, p+n)|$$

$$C\text{-}down2 = |G(k, p-1) - G(k, p-1+n)| + \\ |G(k-1, p) - G(k-1, p+n)|$$

$$C\text{-}left1 = |G(k, p+1) - G(k-n, p+1)| + \\ |G(k+1, p) - G(k+1-n, p)|$$

$$C\text{-}left2 = |G(k, p-1) - G(k-n, p-1)| + \\ |G(k+1, p) - G(k+1-n, p)|$$

$$C\text{-}right1 = |G(k, p-1) - G(k+n, p-1)| + \\ |G(k-1, p) - G(k-1+n, p)|$$

$$C\text{-}right2 = |G(k, p+1) - G(k+n, p+1)| + \\ |G(k-1, p) - G(k-1+n, p)|$$

(A Variant of Step S24).

With respect to function f described for the second embodiment (defined here as f(C)=1/(1+q×C), q=⅓), the weighting factor calculator 55 calculates the weighting factors α-up1, α-up2, α-down1, α-down2, α-left1, α-left2, α-right1, and α-right2 as follows:

$$\alpha\text{-}up1 = f(C\text{-}up1)/sf$$

$$\alpha\text{-}up2 = f(C\text{-}up2)/sf$$

$$\alpha\text{-}down1 = f(C\text{-}down1)/sf$$

$$\alpha\text{-}down2 = f(C\text{-}down2)/sf$$

$$\alpha\text{-}left1 = f(C\text{-}left1)/sf$$

$$\alpha\text{-}left2 = f(C\text{-}left2)/sf$$

$$\alpha\text{-}right1 = f(C\text{-}right1)/sf$$

$$\alpha\text{-}right2 = f(C\text{-}right2)/sf$$

(A Varient of Step S25).

Here, $sf = f(C\text{-}up1) + f(C\text{-}up2) + f(C\text{-}down1) + f(C\text{-}down2) + \\ f(C\text{-}left1) + f(C\text{-}left2) + f(C\text{-}right1) + f(C\text{-}right2)$ With respect to the weighting factors α-up1, α-up2, α-down1, α-down2, α-left1, α-left2, α-right1, and α-right2, the interpolation amount calculator 56 calculates the interpolation amount G'(k, p) of the empty grid point as follows:

$$G'(k, p) = (\alpha\text{-}up1 + \alpha\text{-}up2) \times G(k, p-1) + \\ (\alpha\text{-}down1 + \alpha\text{-}down2) \times G(k, p+1) + \\ (\alpha\text{-}left1 + \alpha\text{-}left2) \times G(k-1, p) + \\ (\alpha\text{-}right1 + \alpha\text{-}right2) \times G(k+1, p)$$

(A Variant of Step S26).

Thus, in the third embodiment, it is possible to improve the accuracy of the interpolation processing just like in the second embodiment.

The following explains the operation of the fourth embodiment. The different characteristics of the fourth embodiment lie in the operation of interpolation processing performed by the correlation amount calculator 54, the weighting factor calculator 55, and the interpolation amount calculator 56. The other operations are the same as the second embodiment. Thus, the explanation thereof is omitted.

The correlation amount calculator 54 calculates the correlation amounts corresponding to the four directions of up, down, right, and left for each of three grid points adjacent to the empty grid point. The grid point adjacent to the empty grid point in the upper direction is designated by U, the grid point adjacent to the empty grid point in the lower direction is designated by D, the grid point adjacent to the empty grid point in the left direction is designated by L, and the grid point adjacent to the empty grid point in the right direction is designated by R.

That is, with respect to the coordinates (k, p) of the empty grid point, the correlation amount calculator 54 calculates the correlation amounts C-up_D, C-up_L, C-up_R, C-down_U, C-down_L, C-down_R, C-left_U, C-left_D, C-left_R, C-right_U, C-right_D, and C-right_L corresponding to the four directions of upper, lower, right, and left of three grid points adjacent to the empty grid point as follows:

$$C\text{-}up\_D = |G(k, p+1) - G(k, p+1-n)|$$

$$C\text{-}up\_L = |G(k-1, p) - G(k-1, p-n)|$$

$$C\text{-}up\_R = |G(k+1, p) - G(k+1, p-n)|$$

$$C\text{-}down\_U = |G(k, p-1) - G(k, p-1+n)|$$

$$C\text{-}down\_L = |G(k-1, p) - G(k-1, p+n)|$$

$$C\text{-}down\_R = |G(k+1, p) - G(k+1, p+n)|$$

$$C\text{-}left\_U = |G(k, p-1) - G(k-n, p-1)|$$

$$C\text{-}left\_D = |G(k, p+1) - G(k-n, p+1)|$$

$$C\text{-}left\_R = |G(k+1, p) - G(k+1-n, p)|$$

$$C\text{-}right\_U = |G(k, p-1) - G(k+n, p-1)|$$

$$C\text{-}right\_D = |G(k, p+1) - G(k+n, p+1)|$$

$$C\text{-}right\_L = |G(k-1, p) - G(k-1+n, p)|$$

(A Variant of Step S24).

With respect to function f shown in the second embodiment, the weighting factor calculator 55 calculates the weighting factors α-up_D, α-up_L, α-up_R, α-down_U, α-down_L, α-down_R, α-left_U, α-left_D, α-left_R, α-right_U, α-right_D, and α-right_L corresponding to each correlation amount as follows:

$$\alpha\text{-up\_D} = f(C\text{-up\_D})$$

$$\alpha\text{-up\_L} = f(C\text{-up\_L})$$

$$\alpha\text{-up\_R} = f(C\text{-up\_R})$$

$$\alpha\text{-down\_U} = f(C\text{-down\_U})$$

$$\alpha\text{-down\_L} = f(C\text{-down\_L})$$

$$\alpha\text{-down\_R} = f(C\text{-down\_R})$$

$$\alpha\text{-left\_U} = f(C\text{-left\_U})$$

$$\alpha\text{-left\_D} = f(C\text{-left\_D})$$

$$\alpha\text{-left\_R} = f(C\text{-left\_R})$$

$$\alpha\text{-right\_U} = f(C\text{-right\_U})$$

$$\alpha\text{-right\_D} = f(C\text{-right\_D})$$

$$\alpha\text{-right\_L} = f(C\text{-right\_L})$$

(A Variant of Step S25).

The interpolation amount calculator 56 calculates the interpolation amount G'(k, p) of the empty grid point as follows:

$$G'(k, p) = \alpha\text{-up\_D} \times (\alpha\text{-up\_L} + \alpha\text{-up\_R})/sf \times G(k, p-1) +$$
$$\alpha\text{-down\_U} \times (\alpha\text{-down\_L} + \alpha\text{-down\_R})/sf \times$$
$$G(k, p+1) + \alpha\text{-left\_R} \times (\alpha\text{-left\_U} + \alpha\text{-left\_D})/sf \times$$
$$G(k-1, p) + \alpha\text{-right\_L} \times (\alpha\text{-right\_U} + \alpha\text{-right\_D})/sf \times$$
$$G(k+1, p)$$

with respect to the weighting factors α-up_D, α-up_L, α-up_R, α-down_U, α-down_L, α-down_R, α-left_U, α-left_D, α-left_R, α-right_U, α-right_D, and α-right_L calculated by the weighting factor calculator 55 (a variant of step S26).

Here, $$sf = \alpha\text{-up\_D} \times (\alpha\text{-up\_L} + \alpha\text{-up\_R}) +$$
$$\alpha\text{-down\_U} \times (\alpha\text{-down\_L} + \alpha\text{-down\_R}) +$$
$$\alpha\text{-left\_R} \times (\alpha\text{-left\_U} + \alpha\text{-left\_D}) +$$
$$\alpha\text{-right\_L} \times (\alpha\text{-right\_U} + \alpha\text{-right\_D})$$

Thus, in the present embodiment, just like the second embodiment, it is possible to improve the accuracy of the interpolation processing.

Figure 11:
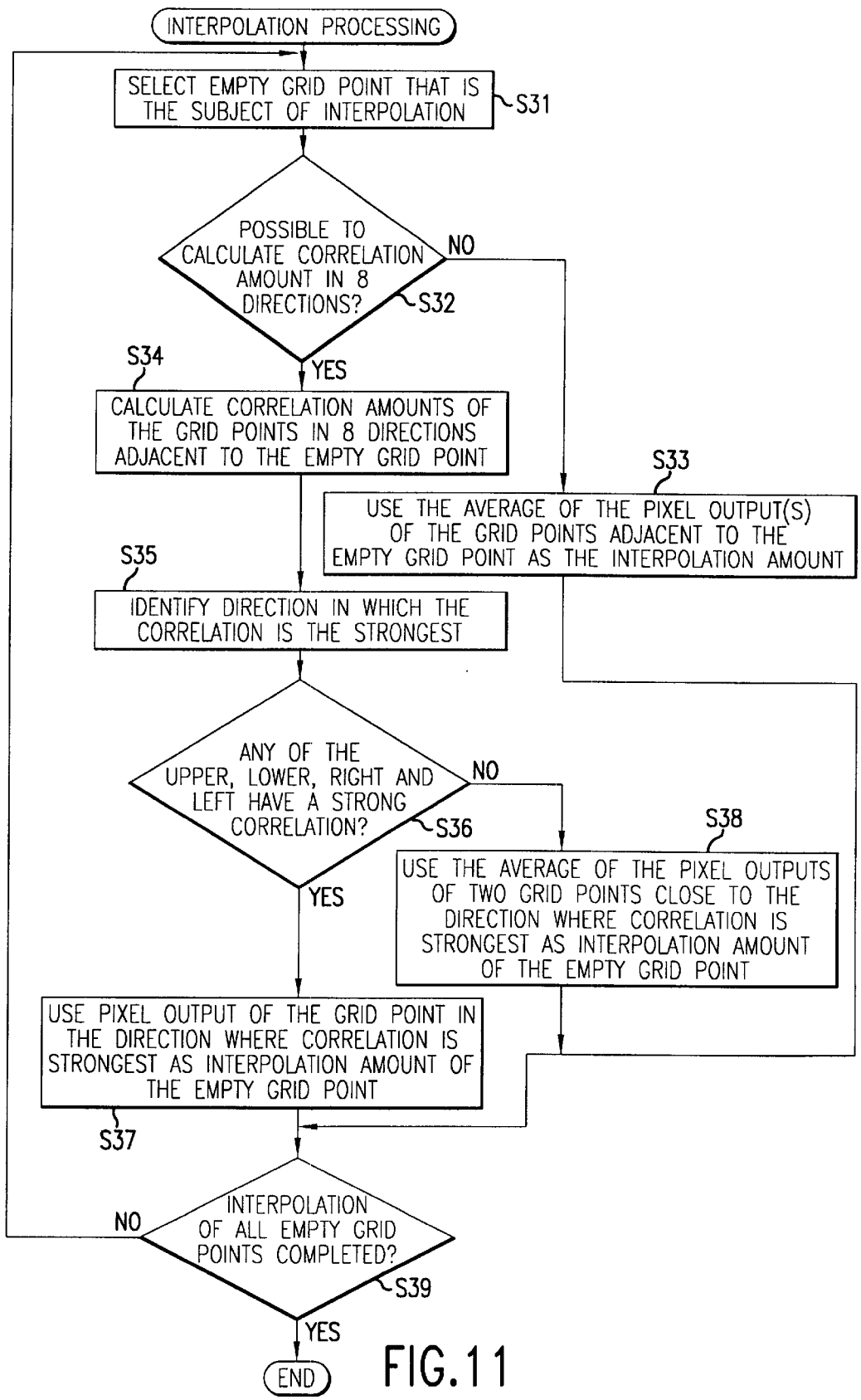
FIG. 11 is an operational flow chart of the interpolation processing of a fifth embodiment.

FIG. 11 is an operational flow chart of the interpolation processing of a fifth embodiment. The structure of the hardware of the fifth embodiment is the same as the block diagram of the first embodiment shown in FIG. 2.

The following explains the operation of the fifth embodiment with reference to FIGS. 2 and 11. The different characteristics of the fifth embodiment lie in the operation of the interpolation processing. As the other operations are the same as the first embodiment, an explanation thereof is omitted.

When the controller 40 recognizes that the release button has been pressed, just like the first embodiment, it instructs the execution of the interpolation processing to the interpolation processor 47 within the signal processor 46. When thus instructed, the interpolation processor 47 selects an empty grid point which becomes the object of interpolation processing, just like the first embodiment (step S31).

When calculating the correlation amounts of the eight directions, which will be discussed later, it is desirable that at least three grid points exist in the four directions of up, down, right, and left of the empty grid point. For example, the determination as to whether or not the calculation of the correlation amount in the eight directions is possible can be made by the determination as to whether or not [4≦k≦X_max−3] and [4≦p≦Y_max−3] are established with respect to the arbitrary coordinates (k, p). Thus, in step S32, the interpolation processor 47 determines whether or not the calculation of the correlation amounts in the eight directions are possible based upon the coordinates of the selected empty grid point.

When the interpolation processor 47 recognizes that the calculation of the correlation amount in the eight directions is impossible by such a determination, the average value of the pixel outputs of the grid points adjacent to the empty grid point is defined as the interpolation amount (step S33).

When the interpolation processor 47 recognizes that the calculation of the correlation amounts in the eight directions is possible, it activates the correlation amount calculator 48, the similar direction detector 49, and the interpolation amount calculator 50. The correlation amount calculator 48 calculates the correlation amounts C-up, C-down, C-left, C-right, C-up_right, C-down_right, C-up_left, and C-down_left corresponding to the eight directions of up, down, left, right, upper right, lower right, upper left, and lower left with respect to the coordinates (k, p) of the empty grid points as follows:

$$C\text{-up} = |G(k, p-1) - G(k, p-1-2xm)| \cdot tu1 +$$
$$|G(k, p+1) - G(k, p+1-2xm)| \cdot tu2 +$$
$$|G(k-1, p) - G(k-1, p-2xm)| \cdot tu3 +$$
$$|G(k+1, p) - G(k+1, p-2xm)| \cdot t4$$

$$C\text{-down} = |G(k, p-1) - G(k, p-1+2xm)| \cdot td1 +$$
$$|G(k, p+1) - G(k, p+1+2xm)| \cdot td2 +$$
$$|G(k-1, p) - G(k-1, p+2xm)| \cdot td3 +$$
$$|G(k+1, p) - G(k+1, p+2xm)| \cdot td4$$

$$C\text{-left} = |G(k, p-1) - G(k-2xm, p-1)| \cdot tl1 +$$
$$|G(k, p+1) - G(k-2xm, p+1)| \cdot tl2 +$$
$$|G(k-1, p) - G(k-1-2xm, p)| \cdot tl3 +$$
$$|G(k+1, p) - G(k+1-2xm, p)| \cdot tl4$$

$$C\text{-right} = |G(k, p-1) - G(k+2xm, p-1)| \cdot tr1 +$$
$$|G(k, p+1) - G(k+2xm, p+1)| \cdot tr2 +$$
$$|G(k-1, p) - G(k-1+2xm, p)| \cdot tr3 +$$
$$|G(k+1, p) - G(k+1+2xm, p)| \cdot tr4$$

$$C\text{-up\_right} = |G(k, p-1) - G(k+m, p-1-m)| \cdot tur1 +$$
$$|G(k, p+1) - G(k+m, p+1-m)| \cdot tur2 +$$
$$|G(k-1, p) - G(k-1+m, p-m)| \cdot tur3 +$$
$$|G(k+1, p) - G(k+1+m, p-m)| \cdot tur4$$

$$C\text{-down\_right} = |G(k, p-1) - G(k+m, p-1+m)| \cdot tdr1 +$$
$$|G(k, p+1) - G(k+m, p+1+m)| \cdot tdr2 +$$
$$|G(k-1, p) - G(k-1+m, p+m)| \cdot tdr3 +$$
$$|G(k+1, p) - G(k+1+m, p+m)| \cdot tdr4$$

-continued $$C\text{-up\_left} = |G(k, p-1) - G(k-m, p-1-m)| \cdot tul1 +$$
$$|G(k, p+1) - G(k-m, p+1-m)| \cdot tul2 +$$
$$|G(k-1, p) - G(k-1-m, p-m)| \cdot tul3 +$$
$$|G(k+1, p) - G(k+1-m, p-m)| \cdot tul4$$

$$C\text{-down\_left} = |G(k, p-1) - G(k-m, p-1+m)| \cdot tdl1 +$$
$$|G(k, p+1) - G(k-m, p+1+m)| \cdot tdl2 +$$
$$|G(k-1, p) - G(k-1-m, p+m)| \cdot tdl3 +$$
$$|G(k+1, p) - G(k+1-m, p+m)| \cdot tdl4$$

(Step S34).

Figure 12:
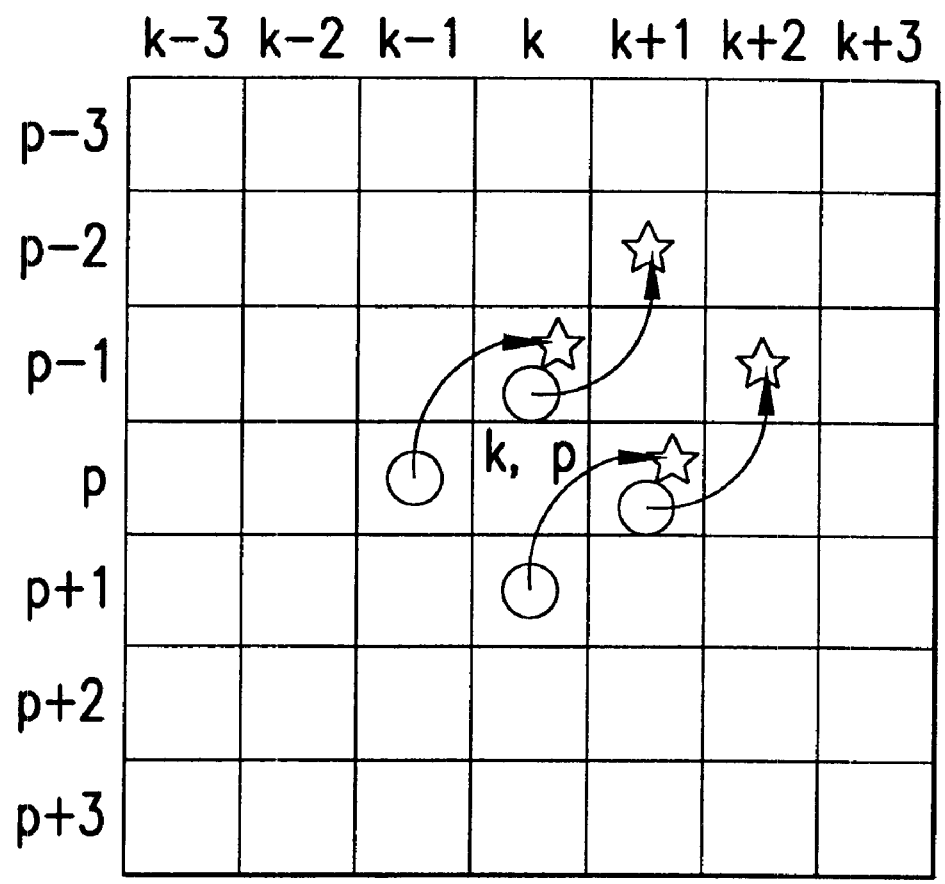
FIG. 12 explains one calculation method of the correlation amount.

In the present embodiment, tu1–tu4, td1–td4, tl1–tl4, tr1–tr4, tur1–tur4, tdr1–tdr4, tul1–tul4, and tdl1–tdl4 are equal to 1 and the correlation amounts C-up, C-down, C-left, C-right, C-up_right, C-down_right, and C-up_left, and C-down_left corresponding to the eight directions are calculated. For example, when m=1 is established, the correlation amount C-up_right of the upper right direction is the sum of the absolute values of the differences between the pixel outputs of the four grid points shown by ○ and the pixel outputs of the four grid points shown by ☆ in FIG. 12.

The similar direction detector 49 identifies the direction where the correlation is the strongest by selecting the smallest value while accounting for equality among the correlation amounts C-up, C-down, C-left, C-right, C-up_right, C-down_right, C-up_left, and C-down_left calculated by the correlation amount calculator 48 (step S35).

The interpolation amount calculator 50 determines whether or not the direction identified by the similar direction detector 49 is any of the directions of up, down, right, and left (step S36). When the interpolation amount calculator 50 determines that the correlation of any of the directions of up, down, right, and left is strong by this kind of determination (YES side of step S36), the pixel output of the grid point adjacent in the direction where the correlation is strong is the interpolation amount of the empty grid point, just like in the first embodiment (step S37). When the interpolation amount calculator 50 determines that the correlation of a diagonal direction is strong by the above-described determination (NO side of step S36), the average value of the pixel output of two grid points among the grid points adjacent to the empty grid point closest to that direction is defined as the interpolation amount of the empty grid point (step S38).

For example, when the correlation of the upper right direction is strong, the average value between the pixel output G(k, p−1) of the grid point adjacent in the upper direction and the pixel output G(k+1, p) of the grid point adjacent in the right direction is defined as G'(k, p). That is, G'(k, p) is calculated as follows:

$$G'(k, p)=(G(k, p-1)+G(k+1, p))/2.$$

Furthermore, when the correlation of the lower right direction is strong, G'(k, p) is calculated as follows:

$$G'(k, p)=(G(k, p+1)+G(k+1,p))/2,$$

when the correlation of the upper left direction is strong, G'(k, p) is calculated as follows:

$$G'(k, p)=(G(k, p-1)+G(k-1, p))/2,$$

and when the correlation of the lower left direction is strong, G'(k, p) is calculated as follows:

$$G'(k, p)=(G(k, p+1)+G(k-1, p))/2.$$

Furthermore, when there are a plurality of directions where the correlation is strong, the average value of the pixel outputs of the grid points of these directions can be defined as the interpolation amount of the empty grid point.

When the interpolation amount of the empty grid point is thus determined, the interpolation processor 47 determines whether or not the interpolation processing of all the empty grid points is completed, just like in the first embodiment (step S39). The interpolation processor 47 repeatedly performs the above-described processing (the process of step S31 and after) until it determines that the interpolation processing of all the empty grid points is completed.

Thus, in the present embodiment, it is possible to estimate the spatial directivity of the empty grid point for not only the upper, lower, right, and left directions, but also for the diagonal directions. Therefore, according to the present embodiment, it is possible to further improve the accuracy of interpolation processing as compared to the first embodiment. In addition, in the present embodiment and the first embodiment, which was described above, the direction where the correlation is the strongest is identified by the similar direction detector 49, but, for example, it is also acceptable to predetermine the threshold value of the correlation amount which can be compared to the pixel output or the like and identify the direction corresponding to a correlation amount lower than the threshold value. Furthermore, it is also acceptable to identify two directions where the correlation is strong, and obtain the interpolation amount of the empty grid point based upon the average value of the pixel outputs of the grid points corresponding to these directions.

Figure 13:
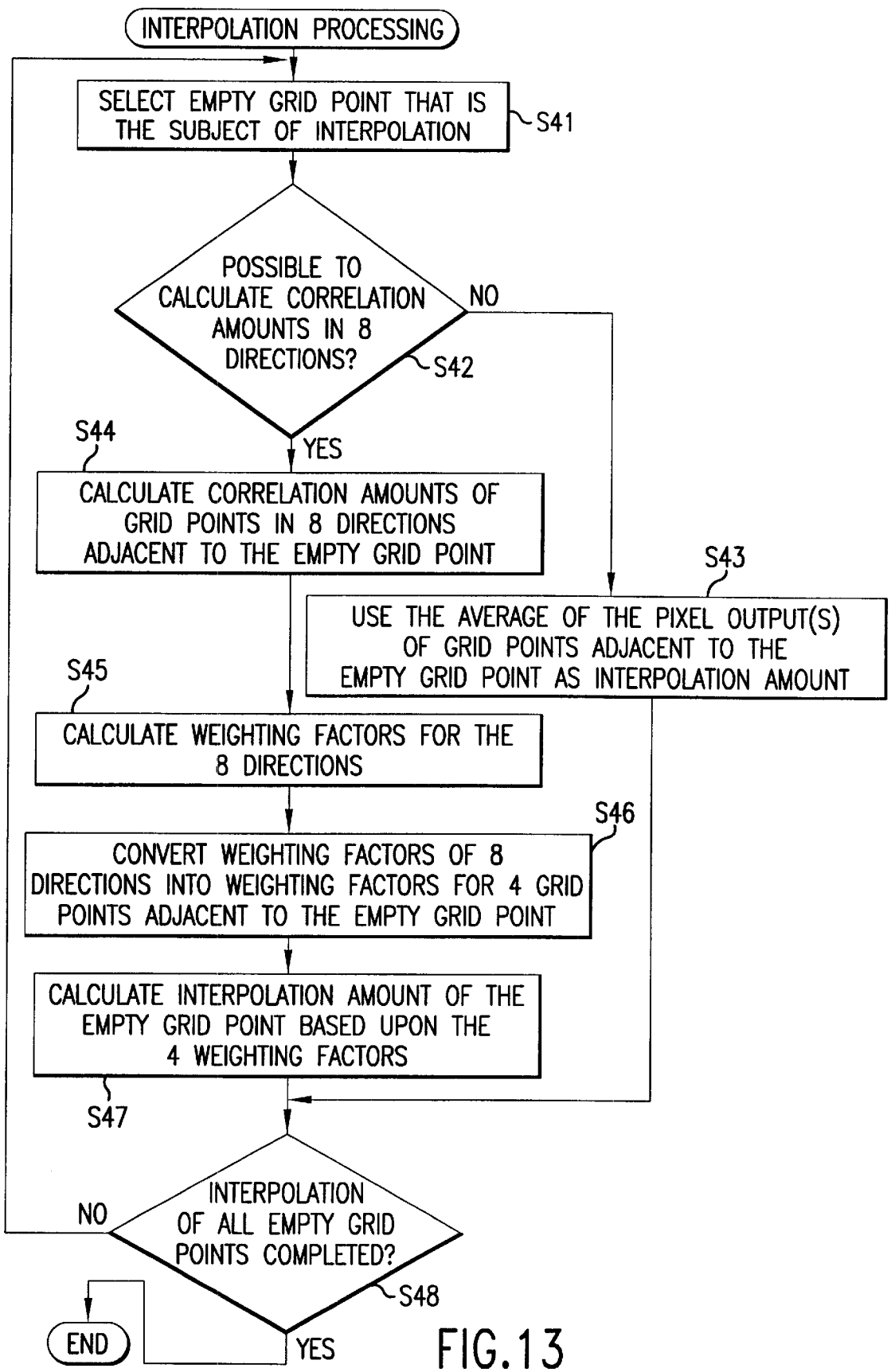
FIG. 13 is an operational flow chart of the interpolation processing of a sixth embodiment.

FIG. 13 is an operational flow chart of the interpolation processing of a sixth embodiment. The structure of the hardware of the sixth embodiment is the same as the block diagram shown in FIG. 7.

The following explains the operation of the sixth embodiment with reference to FIGS. 7 and 13. The different characteristics of the sixth embodiment lie in the operation of the interpolation processing. As the other operations are the same as the second embodiment, the explanation thereof is omitted.

The controller 40 instructs interpolation processor 53 within the signal processor 46 to execute the interpolation processing when it determines that the release button has been pressed, just like in the second embodiment. When thus instructed, the interpolation processor 53 selects the empty grid point which will become the object of the interpolation processing, just like in the second embodiment (step S41).

When the interpolation amount in the eight directions, which will be discussed later, is calculated, it is desirable that at least two pixels exist for the four directions of up, down, right, and left of the empty grid point. For example, the determination as to whether or not the calculation of the correlation amounts in the eight directions is possible can be performed by making the determination as to whether or not [$3 \leq k \leq X\_max-2$] and [$3 \leq p \leq Y\_max-2$] are established with respect to the arbitrary coordinates (k, p). Therefore, the interpolation processor 53 determines whether or not the calculation of the interpolation amounts in the eight directions is possible based upon the coordinates of the selected empty grid point (step S42).

When the interpolation processor 53 determines that the calculation of the correlation amounts in the eight directions is impossible by this kind of determination, the average value of the pixel outputs of the grid points adjacent to the empty grid point is defined as the interpolation amount (step S43).

When the interpolation processor 53 determines that the calculation of the correlation amounts in the eight directions is possible, the correlation amount calculator 54 activates the weighting factor calculator 55 and the interpolation amount calculator 56. The correlation amount calculator 54 calculates the correlation amounts C-up, C-down, C-left, C-right, C-up_right, C-down_right, C-up_left, and C-down_left corresponding to the eight directions as follows:

$$C\text{-up} = |G(k, p+1) - G(k, p+1-2xm)| + |G(k-1, p) - G(k-1, p-2xm)| + |G(k+1, p) - G(k+1, p-2xm)|$$

$$C\text{-down} = |G(k, p-1) - G(k, p-1+2xm)| + |G(k-1, p) - G(k-1, p+2xm)| + |G(k+1, p) - G(k+1, p+2xm)|$$

$$C\text{-left} = |G(k, p-1) - G(k-2xm, p-1)| + |G(k, p+1) - G(k-2xm, p+1)| + |G(k+1, p) - G(k+1-2xm, p)|$$

$$C\text{-right} = |G(k, p-1) - G(k+2xm, p-1)| + |G(k, p+1) - G(k+2xm, p+1)| + |G(k-1, p) - G(k-1+2xm, p)|$$

$$C\text{-up\_right} = |G(k, p-1) - G(k+m, p-1-m)| + |G(k, p+1) - G(k+m, p+1-m)| + |G(k-1, p) - G(k-1+m, p-m)| + |G(k+1, p) - G(k+1+m, p-m)|$$

$$C\text{-down\_right} = |G(k, p-1) - G(k+m, p-1+m)| + |G(k, p+1) - G(k+m, p+1+m)| + |G(k-1, p) - G(k-1+m, p+m)| + |G(k+1, p) - G(k+1+m, p+m)|$$

$$C\text{-up\_left} = |G(k, p-1) - G(k-m, p-1-m)| + |G(k, p+1) - G(k-m, p+1-m)| + |G(k-1, p) - G(k-1-m, p-m)| + |G(k+1, p) - G(k+1-m, p-m)|$$

$$C\text{-down\_left} = |G(k, p-1) - G(k-m, p-1+m)| + |G(k, p+1) - G(k-m, p+1+m)| + |G(k-1, p) - G(k-1-m, p+m)| + |G(k+1, p) - G(k+1-m, p+m)|$$

(Step S44).

Then, the weighting factor calculator 55 calculates the weighting factors α-up, α-down, α-left, α-right, α-up_right, α-down_right, α-up_left, and α-down_left corresponding to the eight directions with respect to function f (here, f(C)=1/(1+q×C), q=⅓) just like in the second embodiment as follows:

α-up=f(C-up)/sf

α-down=f(C-down)/sf

α-left=f(C-left)/sf

α-right=f(C-right)/sf

α-up_right=f(C-up_right)/sf

α-down_right=f(C-down_right)/sf

α-up_left=f(C-up_left)/sf

α-down_left=f(C-down_right)/sf (Step S45).

Here, $$sf = f(C\text{-up}) + f(C\text{-down}) + f(C\text{-left}) + f(C\text{-right}) + f(C\text{-up\_right}) + f(C\text{-down\_right}) + f(C\text{-up\_left}) + f(C\text{-down\_right})$$

Furthermnore, the weighting factor calculator 55 converts the calculated weighting factors of the eight directions to weighting factors corresponding to the four grid points adjacent to the empty grid point (step S46). That is, the weighting factor calculator 55 calculates the weighting factors α-U, α-D, α-L, and α-R corresponding to the grid points adjacent to the four directions of up, down, left and right of the empty grid point as follows:

α-U=α-up+(α-up_right+α-up_left)/2

α-D=α-down+(α-down_right+α-down_left)/2

α-L=α-left+(α-up_left+α-down_left)/2

α-R=α-right+(α-down_right+α-up_right)/2

With respect to the weighting factors α-U, α-D, α-L, and α-R calculated by the weighting factor calculator 55, the interpolation amount calculator 56 calculates the interpolation amount G'(k, p) of the empty grid point as follows:

$$G'(k, p) = \alpha\text{-}U \times G(k, p-1) + \alpha\text{-}D \times G(k, p+1) + \alpha\text{-}L \times G(k-1, p) + \alpha\text{-}R \times G(k+1, p)$$

(Step S47).

When the interpolation amount of the empty grid points is thus determined, the interpolation processor 53 determines whether or not the interpolation processing of all the empty grid points is completed, just like in the second embodiment (step S48). The interpolation processor 53 repeatedly performs the above-described processing (the process of step S41 and after) until it determines that the interpolation processing of all the empty grid points is completed.

Thus, in the sixth embodiment, it is possible to estimate the spatial directivity of the empty grid points for not only the up, down, right, and left directions, but also the diagonal directions, and to obtain weighting factors based upon the thus-estimated directivities when the interpolation amount is calculated. Therefore, according to the sixth embodiment, it is possible to further improve the accuracy of the interpolation processing, as compared to the second embodiment.

Furthermore, in the sixth embodiment, the conversions of the weighting factors are performed in the weighting factor calculator 55, but this kind of conversion also can be performed in the interpolation processor 53 by calculating the interpolation amount G'(k, p) of the empty grid point as follows:

$$G'(k, p) = \alpha\text{-up} \times G(k, p-1) +$$
$$\alpha\text{-down} \times G(k, p+1) +$$
$$\alpha\text{-left} \times G(k-1, p) +$$
$$\alpha\text{-right} \times G(k+1, p) +$$
$$\alpha\text{-up\_right} \times (G(k, p-1) + G(k+1, p))/2 +$$
$$\alpha\text{-down\_right} \times (G(k, p+1) + G(k+1, p))/2 +$$
$$\alpha\text{-up\_left} \times (G(k, p-1) + G(k-1, p))/2 +$$
$$\alpha\text{-down\_left} \times (G(k, p+1) + G(k-1, p))/2$$

Furthermore, in the sixth embodiment, the correlation amounts of the four directions of up, down, right, and left and the weighting factors corresponding to these correlation amounts are calculated as in the second embodiment, but, for example, it is also possible to calculate them just like in the third and fourth embodiments.

Moreover, in the sixth embodiment and the fifth embodiment, which were described above, for example, when the correlation amount of the upper right direction is obtained, the absolute values of the differences between the pixel outputs of the grid point adjacent in the left direction of the empty grid point and the pixel output of the grid point adjacent in the upper direction were calculated, but it is also possible to omit such a calculation of the absolute value. That is, it is possible to calculate the correlation amounts C-up_right, C-down_right, C-up_left, and C-down_left corresponding to the upper right, lower right, upper left, and lower left directions as follows:

$$\text{C-up\_right} = |G(k, p-1) - G(k+m, p-1-m)| +$$
$$|G(k+1, p) - G(k+1+m, p-m)|$$
$$\text{C-down\_right} = |G(k, p+1) - G(k+m, p+1+m)| +$$
$$|G(k+1, p) - G(k+1+m, p+m)|$$
$$\text{C-up\_left} = |G(k, p-1) - G(k-m, p-1-m)| +$$
$$|G(k-1, p) - G(k-1-m, p-m)|$$
$$\text{C-down\_left} = |G(k, p+1) - G(k-m, p+1+m)| +$$
$$|G(k-1, p) - G(k-1-m, p+m)|$$

In the sixth embodiment and the fifth embodiment, which were described above, the correlation amounts C-down, C-right, C-up_right, and C-down_right corresponding to four of the eight directions are calculated by the total sum of the absolute values of the differences of the pixel outputs of the grid points, but it is also acceptable to calculate the total sum with predetermined weightings being applied to these kinds of absolute values of the differences.

Moreover, in the sixth embodiment and the fifth embodiment, which was described above, when it is recognized that the calculations of the correlation amounts of the eight directions are impossible, the average value of the pixel outputs of the grid points adjacent to the empty grid point is defined as the interpolation amount. However, it is also acceptable to obtain the interpolation amount by obtaining the correlation amounts of these directions by the above-described formula when a direction exists where the calculation of the correlation amounts is possible. For example, in FIG. 5, when calculating G'(2, 3), it is possible to obtain the correlation amounts C-down, C-right, C-up_right and C-down_right of the down direction, the right direction, the upper right direction, and the lower right direction as follows:

$$\text{C-down} = |G(2, 2) - G(2, 4)| +$$
$$|G(2, 4) - G(2, 6)| +$$
$$|G(1, 3) - G(1, 5)| +$$
$$|G(3, 3) - G(3, 5)|$$

$$\text{C-right} = |G(2, 2) - G(4, 2)| +$$
$$|G(2, 4) - G(4, 4)| +$$
$$|G(1, 3) - G(3, 3)| +$$
$$|G(3, 3) - G(5, 3)|$$

$$\text{C-up\_right} = |G(2, 2) - G(3, 1)| +$$
$$|G(2, 4) - G(3, 3)| +$$
$$|G(1, 3) - G(2, 2)| +$$
$$|G(3, 3) - G(4, 2)|$$

$$\text{C-down\_right} = |G(2, 2) - G(3, 3)| +$$
$$|G(2, 4) - G(3, 5)| +$$
$$|G(1, 3) - G(2, 4)| +$$
$$|G(3, 3) - G(4, 4)|$$

Furthermore, in the sixth embodiment and the second through fourth embodiments which were described above, as an example of a function f used when calculating the weighting factors, $$f(C) = 1/(1 + q \times C)$$

was shown, but the present invention is not limited to this function. For example, $$f(C) = 1/(1 + q \times C^2),$$

$$f(C) = 1/(1 + q \times C^{1/2}),$$

or the like are also acceptable.

Furthermore, in the sixth embodiment and the second through fourth embodiments, which were described above, the weighting factors are calculated by formulas where function f is determined every time the interpolation amount of the empty grid point is calculated. However, for example, it is also acceptable to pre-store weighting factors corresponding to the correlation amounts of each direction within a memory disposed in the weighting factor calculator 55 and to read them every time the interpolation amount is calculated.

By combining the first embodiment with any of the second through the fourth embodiments, or combining the fifth and sixth embodiments, when the correlation amount of one direction stands out (is strongest), the interpolation amount of the empty grid point is obtained based upon the pixel output of the grid points corresponding to that direction, and when it cannot be easily recognized whether or not the correlation of any direction is strong because the directivity of the pixel output is complicated, it is also possible to obtain the interpolation amount of the empty grid point based upon weighting factors.

In addition, in each embodiment described above, the interpolation processing in the green color was performed, but the present invention is not limited to this kind of interpolation processing. For example, by applying the pixels which output red color and the pixels which output blue color to the image signal formed by the imaging element arrayed in a checkered configuration, it is also possible to perform the interpolation processing for red and blue colors.

In addition, in each embodiment described above, the correlation amount of each direction is calculated by using four or three grid points adjacent to the empty grid point. However, for example, it is also acceptable to calculate the correlation amount of the upper direction by using the two grid points included in up1, (or the two grid points included in up2) shown in FIG. 10A. Furthermore, it is possible to calculate the correlation amount of a diagonal direction by using two grid points.

By calculating the correlation amount by thus using two grid points, it is possible to decrease the grid points used when calculating the correlation amounts so that it is possible to accurately obtain the interpolation amount even for a narrow area in which the directivity of the pixel output appears to be strong. Furthermore, it is possible to reliably decrease the calculation amount when the correlation amount of each direction is calculated, so it is possible to improve the efficiency of the interpolation processing.

In addition, in each embodiment described above, the correlation amount corresponding to each direction was calculated by defining the coefficient applied to the absolute value of the difference of the pixel output of the grid points as 1. However, this coefficient may also be defined as a predetermined arbitrary constant. For example, this kind of factor can also be determined just like the above-described weighting factors ($\alpha$-up, $\alpha$-down, $\alpha$-left, $\alpha$-right, or the like).

When the present invention has an imaging element of the structure where the grid points and empty grid points are arrayed in a checkered configuration, it is applicable regardless of whether it has a single plate, multiple plates, or a color filter.

Figures 17A, 17B:
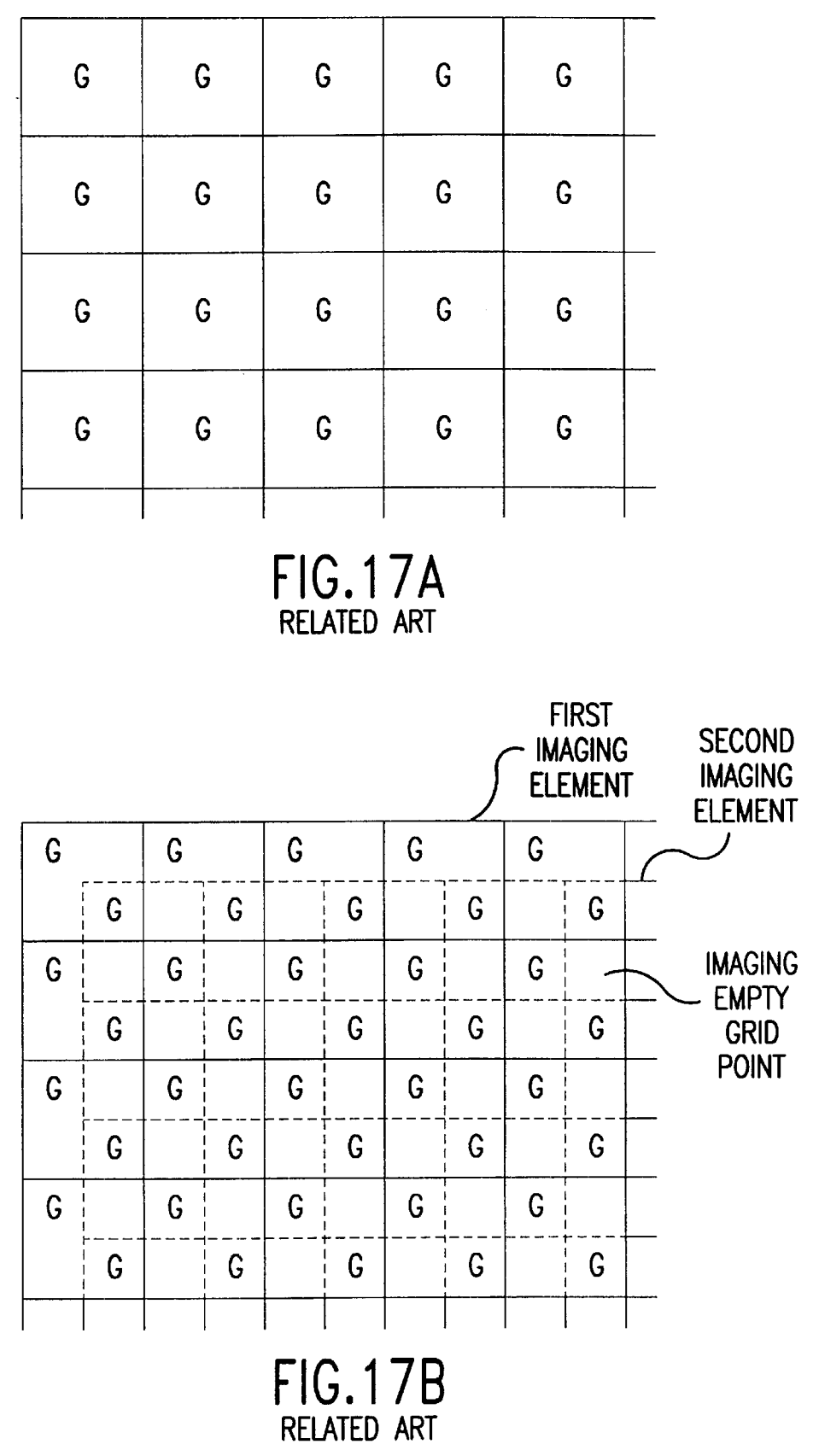

As shown in FIG. 17A, it is also applicable to an imaging element that is not arranged in a checkered configuration.

For example, in FIG. 17A, when the center part of the pixel outputs of four green color (G) is taken as an imaginary empty grid point, by rotating the imaging elements shown in FIG. 17A by 45 degrees, it can be said that the grid points are arrayed in the four directions of above, below, right, and left of the empty grid point. Because of this, just like in each embodiment described above, it is possible to calculate the interpolation amount of the empty grid point.

Is In each embodiment described above, the interpolation processing is performed by providing the interpolation processors 47 and 53 within an electronic still camera. However, this kind of interpolation processing also can be performed by an image processing device and a computer.

Figure 14:
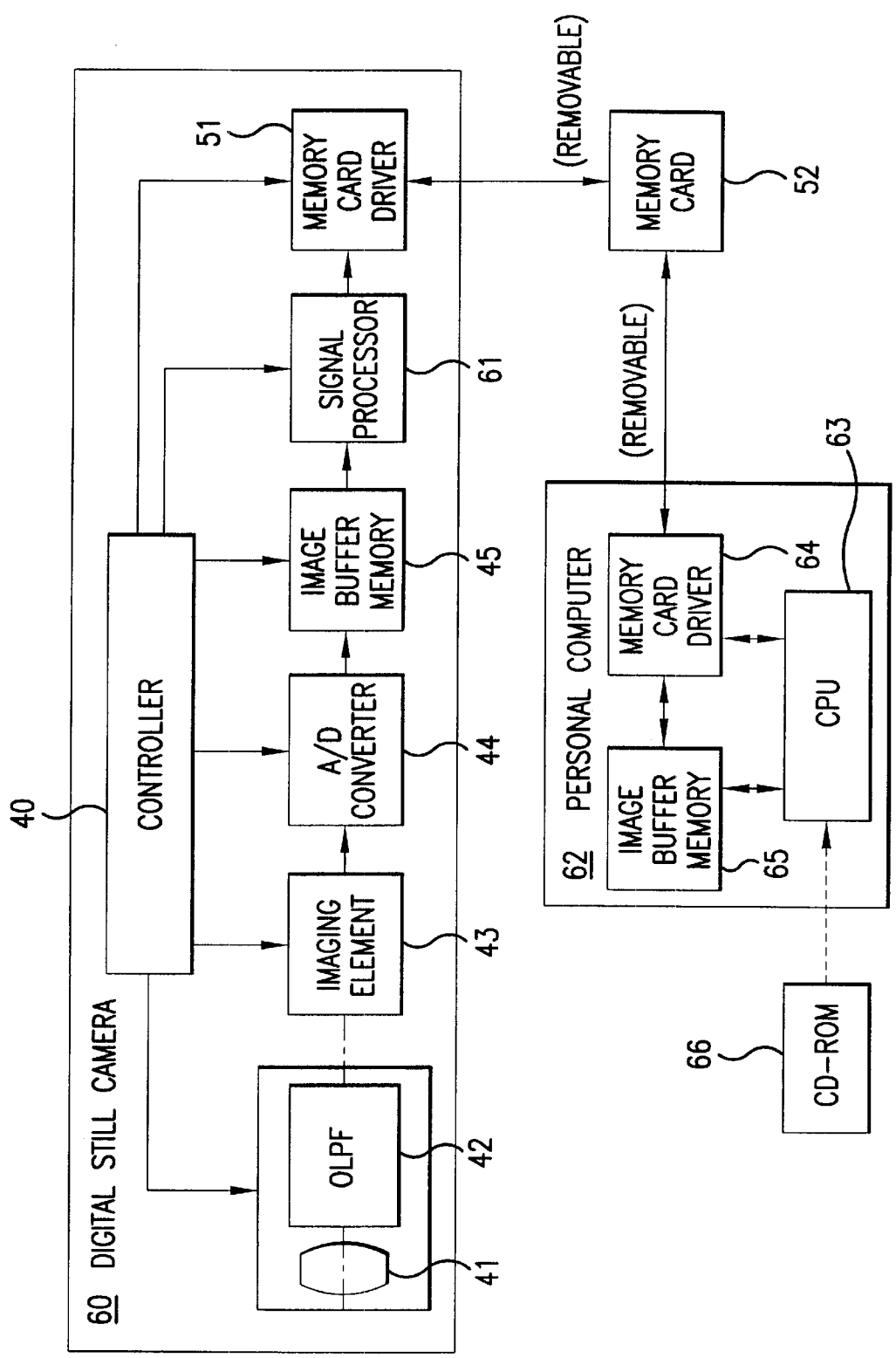
FIG. 14 is a block diagram of the seventh embodiment.

FIG. 14 is a block diagram of a seventh embodiment. The seventh embodiment uses a recording medium on which is recorded the interpolation processing program, and can be used, for example, for the execution of the interpolation processing by a personal computer.

In FIG. 14, when the function is the same as the block diagrams shown in FIGS. 2 and 7, the same symbols are used and the explanation of the structure is omitted. The difference of the structure between the electronic still camera 60 shown in FIG. 14 and the embodiment shown in FIGS. 2 and 7 is that the signal processor 61 is provided instead of the signal processor 46 and the output of the image buffer memory 45 is connected to the signal processor 61 and the output of the signal processor 61 is connected to the memory card driver 51.

In FIG. 14, the personal computer 62 has CPU 63, a memory card driver 64, and an image buffer memory 65. CPU 63 is connected to the memory card driver 64 and the image buffer memory 65, and the memory card driver 64 and the image buffer memory 65 are connected to each other.

In CPU 63, an interpolation processing program recorded, for example, on a CD/ROM 66 is installed in advance.

Here, the recording medium on which is recorded the interpolation processing program corresponds to CD/ROM 66. The interpolation processing program can include, for example, the correlation amount calculation procedure, similar direction discernment procedure, interpolation amount determination procedure, weighting factor calculation procedure, interpolation amount calculation procedure, and weighting factor conversion procedure previously described, and are performed by CPU 63.

Figure 15A:
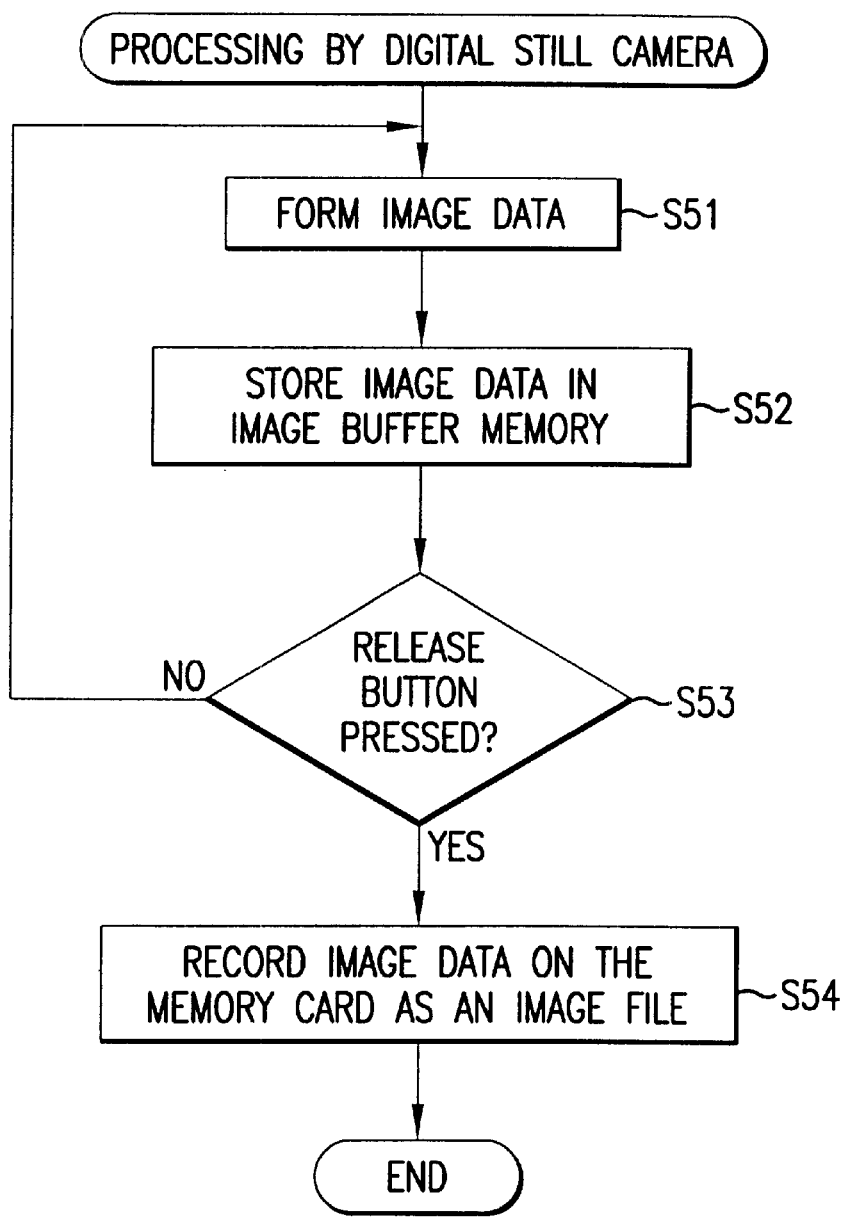
FIGS. 15A and 15B are flow charts applicable to the seventh embodiment.
Figure 15B:
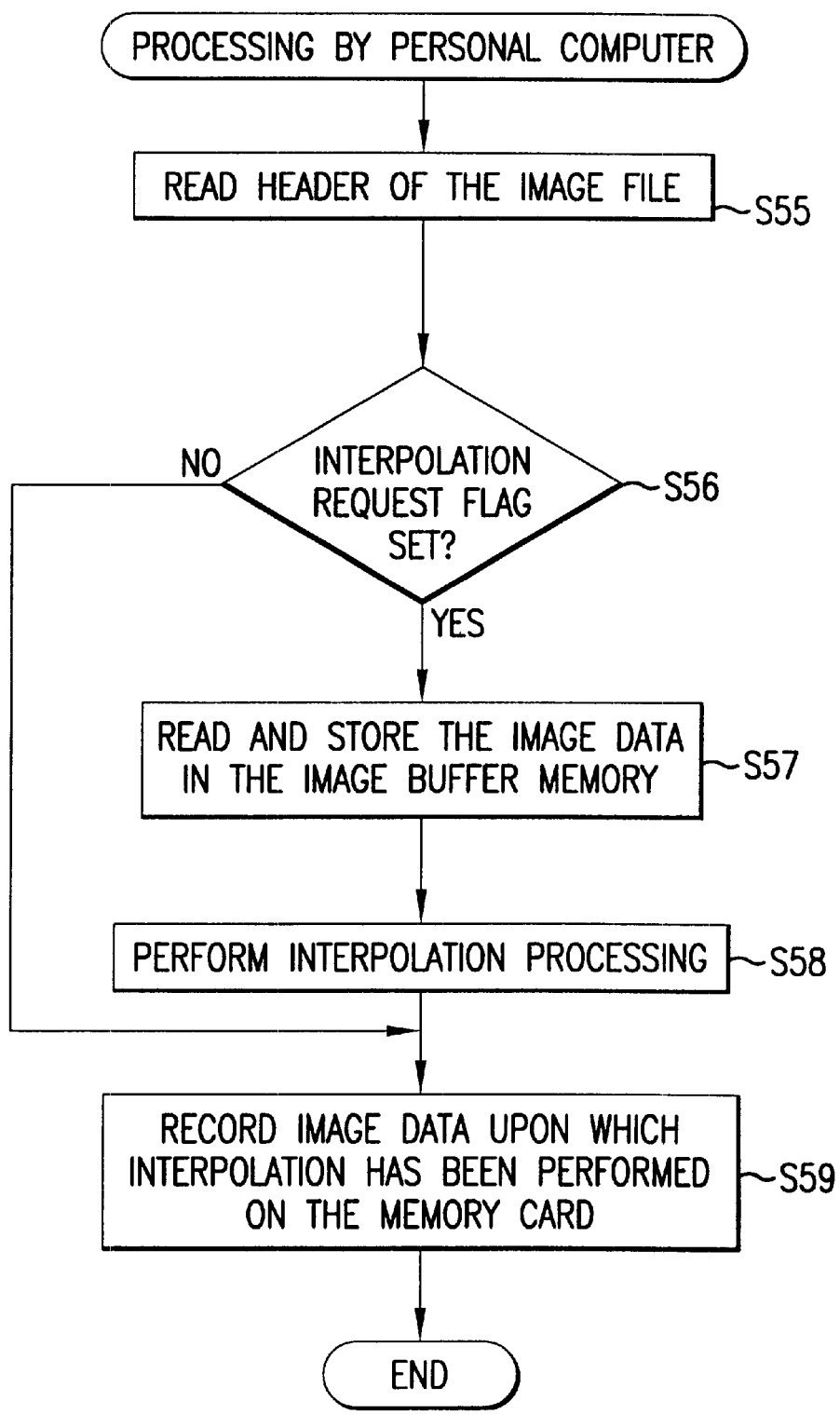

FIGS. 15A and 15B are operational flow charts of the seventh embodiment. The following explains the operation of the seventh embodiment with reference to FIGS. 14 and 15A–B. In the electronic still camera 60, signal charges are formed on the imaging element 43, just like in the first embodiment. Furthermore, the imaging element 43 forms an image signal by scanning the signal charges which are thus formed and provides it to the A/D converter 44.

The A/D converter 44 A/D converts the image signal and forms the image data (step S51). The image data which is thus formed is temporarily stored in the image buffer memory 45 (step S52). This type of process is repeatedly performed based upon the timing control by the controller 40.

The controller 40 determines whether or not the release button (not depicted) has been pressed (step S53), and when it determines that the release button has been pressed, it instructs the signal processor 61 and the memory card driver 51 to record the image data stored in the image buffer memory 45 to the memory card 52 (step S54).

In the signal processor 61, processing such as $\gamma$ correction is performed to the image data stored in the image buffer memory 45 (the interpolation processing is not performed here), and the image data is given to the memory card driver 51. Furthermore, the signal processor 61 provides information that shows that the image data needs interpolation processing to the memory card driver 51.

The memory card driver 51 records the image data to the memory card 52 in the form of an image file and simultaneously raises (sets) an interpolation request flag (a flag showing that the image data needs interpolation processing) that is provided in the header part of the image file.

When, the memory card 52 in which the image data is thus recorded is loaded into the personal computer 62, CPU 63 reads the header part of the image file through the memory card driver 64 (step S55). When CPU 63 thus reads the header part of the image file, it determines whether or not the interpolation request flag is set (step S56).

Only when CPU 63 determines that the interpolation request flag is set by this kind of determination, the image data is read through the memory card driver 64 and is stored in the image buffer memory 65 (step S57).

Then, CPU 63 performs interpolation processing to the image data stored in the image buffer memory 65 (step S58). The interpolation processing of the present embodiment is the same as the interpolation processing of each embodiment described above, so an explanation thereof is omitted.

CPU 63 records the image data to which the interpolation processing was performed to the memory card 52 through the memory card driver 64 when the interpolation processing is completed (step S59).

Thus, in the seventh embodiment, the interpolation processing that is the same as that of the various embodiments described above can be reliably performed by the personal computer 62. Therefore, according to the seventh embodiment, it is possible to reliably estimate the spatial directivity of the empty grid points in detail so that it is possible to reliably improve the accuracy of interpolation processing. Furthermore, in the present embodiment, the personal computer 62 obtains the image data where the interpolation processing is to be performed through a memory card, but any method can be used for the method of obtaining the image data.

For example, when applying the present invention to a personal computer with a communication means (such as, for example, an infrared or radio-wave transceiver or a dedicated cable) it is also possible to perform the interpolation processing to image data which is given through the communication means.

Additionally, a CD-ROM is only one type of recording medium upon which the interpolation process can be recorded. The recording medium can be readily removable, such as, for example, a CD-ROM, or relatively fixed, such as, for example, an internal ROM, RAM or hard drive. Another type of recording medium is, for example, a transient recording medium such as, for example, a carrier wave. By transmitting the interpolation program as a computer data signal embodied in a carrier wave (carrier wave type of recording medium), the interpolation program can be transmitted to, for example, the personal computer or the electronic camera, via a communications network such as, for example, the World Wide Web.

As detailed above, according to one aspect of the invention, the directivity of the pixel output of the grid points adjacent to an empty grid point is obtained in correlation to the four directions of up, down, right, and left. Then, the interpolation amount of the empty grid point is determined based upon the directivity thus obtained. Because of this, it is possible to improve the reliability of the interpolation amount of the empty grid point.

According to another aspect, even when there is an image for which it cannot easily be recognized whether or not the correlation of any direction is strong (i.e., due to the complexity of the directivity of the pixel output), the interpolation amount of the empty grid point can be reliably calculated based upon using weighting factors corresponding to the correlation amount for each direction. Because of this, it is possible to perform interpolation processing that reliably reflects the directivity of the pixel output.

According to another aspect, even when the area where the directivity of the pixel output appears to be strong is narrow, it is possible to reliably obtain the interpolation amount.

Furthermore, according to another aspect, it is possible to decrease the calculation amount performed when calculating the correlation amount for each direction, making it possible to improve the efficiency of the interpolation processing.

According to another aspect, the directivity of the pixel output of the grid points adjacent to the empty grid point can be obtained with respect to eight directions, including the upper right direction, the lower right direction, the upper left direction, and the lower left direction in addition to the four directions of up, down, right, and left. Because of this, it is possible to further improve the reliability of the interpolation amount of the empty grid point.

Figure 20:
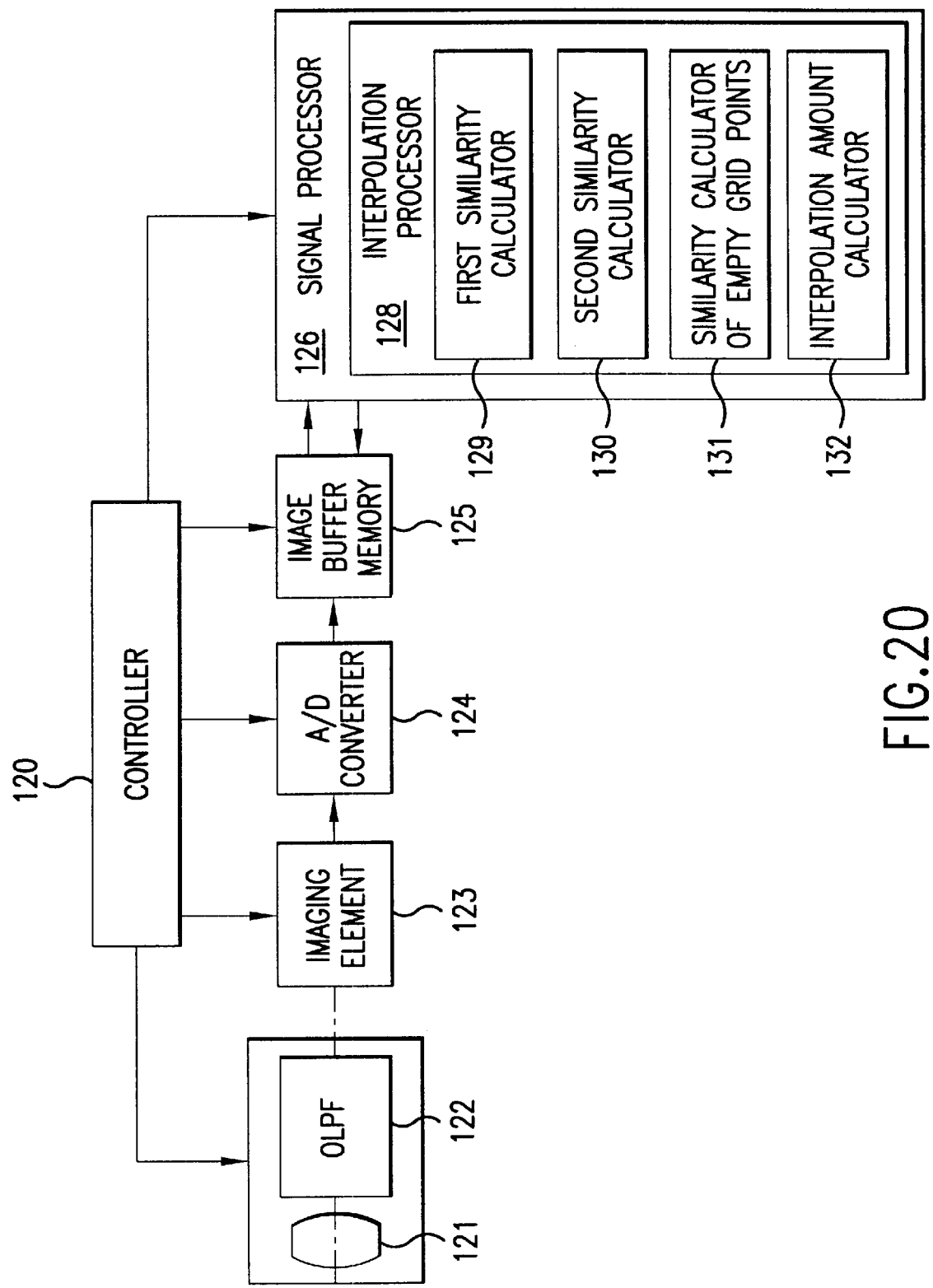
FIG. 20 is a block diagram of an eighth embodiment.

FIG. 20 is a block diagram of an eighth embodiment. In FIG. 20, the output of the controller 120 is connected to the shooting optical system 121, the OLPF (Optical Low Pass Filter) 122, the imaging element 123, the A/D converter 124, the image buffer memory 125 and the signal processor 126. The signal processor 126 includes an interpolation processor 128. The interpolation processor 128 is composed of a first similarity calculator 129, a second similarity calculator 130, an empty grid point calculator 131 and an interpolation amount calculator 132.

The optical image obtained at the shooting optical system 121 is filtered by the OLPF 122, and is sent to the imaging element 123. It is also possible that the optical image obtained at the shooting optical system 121 is directly given to the imaging element 123 without providing the OLPF 122. The output of the imaging element 123 is connected to the A/D converter 124. The output of the A/D converter 124 is connected to the image buffer memory 125 and the output of the image buffer memory 125 is connected to the signal processor 126.

Figure 21:
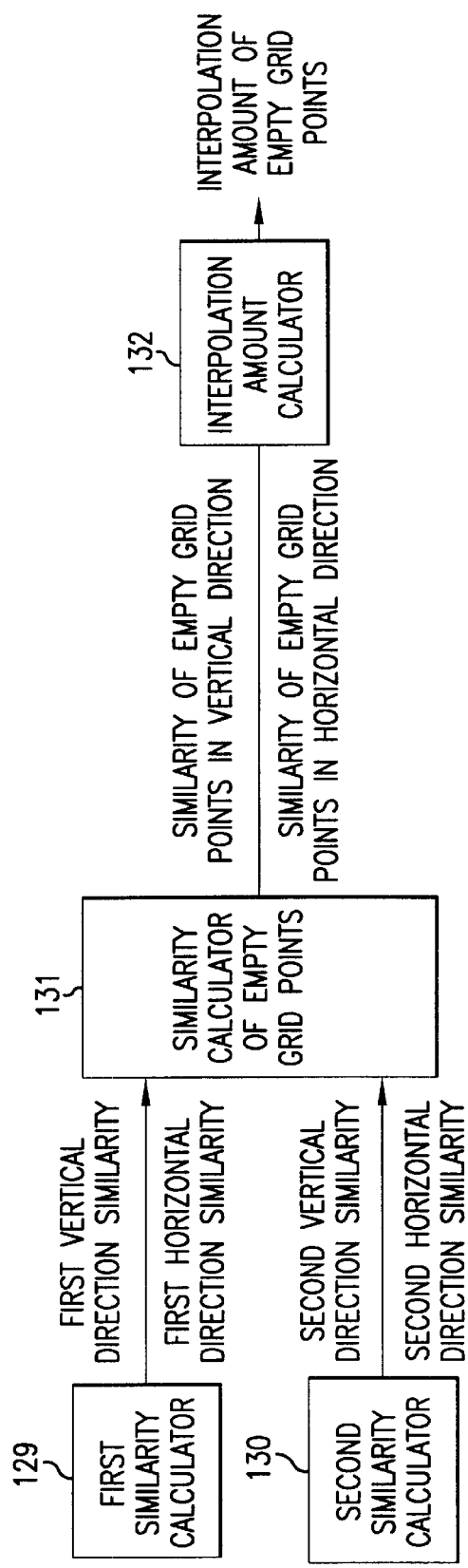
FIG. 21 explains the flow of data of an interpolation processor of FIG. 20.

In the eighth embodiment, as shown in FIG. 16A an imaging element of a color filter of R, G and B colors in a Bayer array is adopted as the imaging element 123, and the buffer memory 125 includes three areas that correspond to these three colors. Here, the area that corresponds to the green color in the image buffer memory 125 is composed of an area that stores the image data (corresponding to the pixel output of the grid points) formed by the A/D converter 124 and an area that stores the image data (corresponding to the interpolation amount of the empty grid points) obtained by the later-mentioned interpolation processing. FIG. 21 explains the data flow in the interpolation processor 128. In FIG. 21, the first vertical direction similarity and the first horizontal direction similarity that are output from the first similarity calculator 129, and the second vertical direction similarity and the second horizontal direction similarity that are output from the second similarity calculator 130, are provided to the similarity calculator 131.

The similarity of empty grid points in the vertical direction and the similarity of the empty grid points in the horizontal direction that are output from the empty grid points similarity calculator 131 are provided to the interpolation amount calculator 132. The interpolation amount calculator 132 outputs the interpolation amount of the empty grid points. The output of the signal processor 126 (corresponding to the output of the interpolation amount calculator 132) is connected to the image buffer memory 125.

FIG. 22 shows the pixel output of an empty grid point that is to be interpolation processed, and the surrounding grid points. In FIG. 22, the coordinates of the empty pixel that is to be interpolation processed are indicated as (i, j). The pixel outputs of each grid point positioned in the vicinity of the empty grid point are shown by:

$G(i, j-1) = G1$ $G(i+1, j) = G2$ $G(i, j+1) = G3$ $G(i-1, j) = G4$ $G(i-1, j-2) = G5$ $G(i+1, j-2) = G6$ $G(i+2, j-1) = G7$ $G(i+2, j+1) = G8$ $G(i+1, j+2) = G9$ $G(i-1, j+2) = G10$ $G(i-2, j+1) = G11$ $G(i-2, j-1) = G12$

Figure 23:
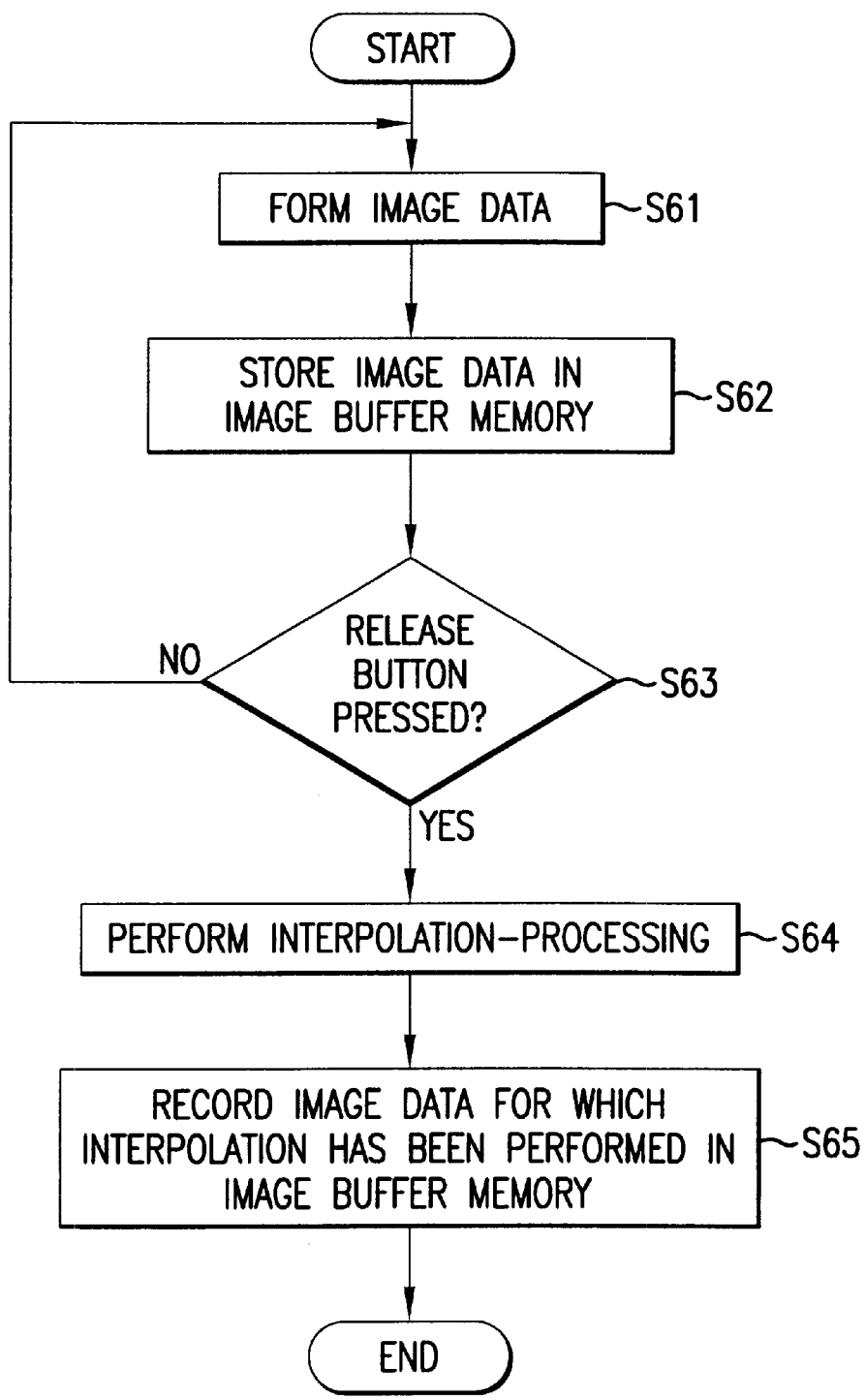
FIG. 23 is an operational flow chart of the eighth embodiment.
Figure 24:
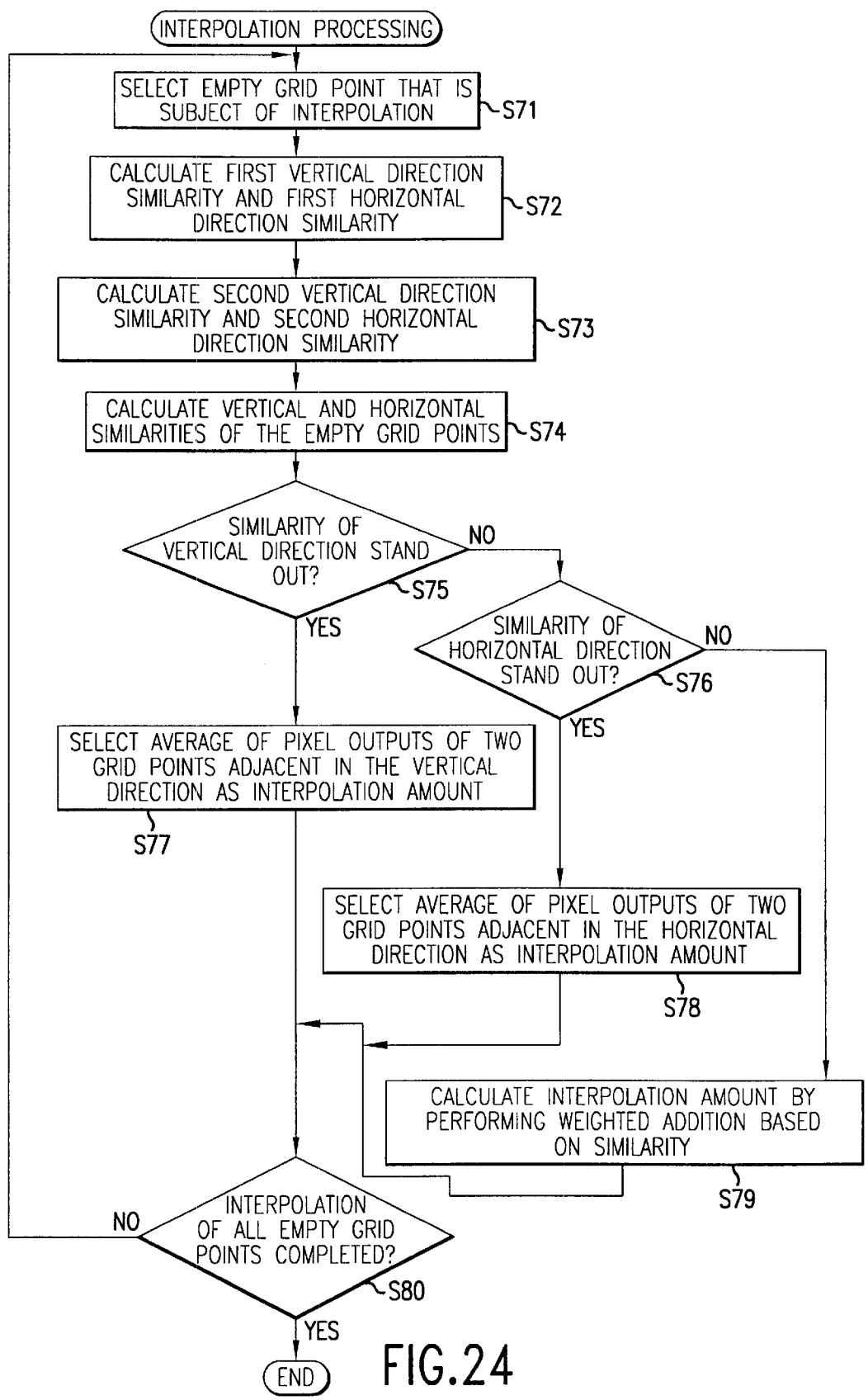
FIG. 24 is an operational flow chart of the interpolation processing of the eighth embodiment.
Figure 25A:
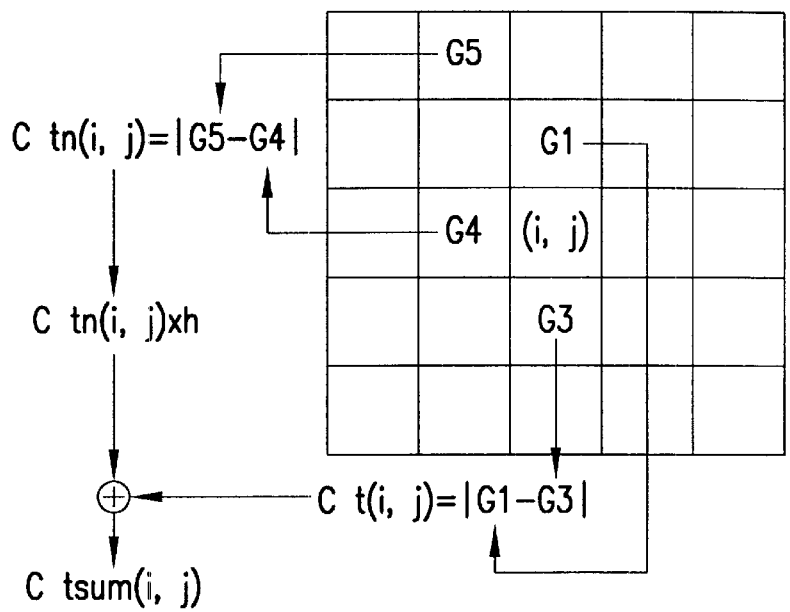
FIGS. 25A–25B explain a method of calculating similarity in the eighth embodiment.
Figure 25B:
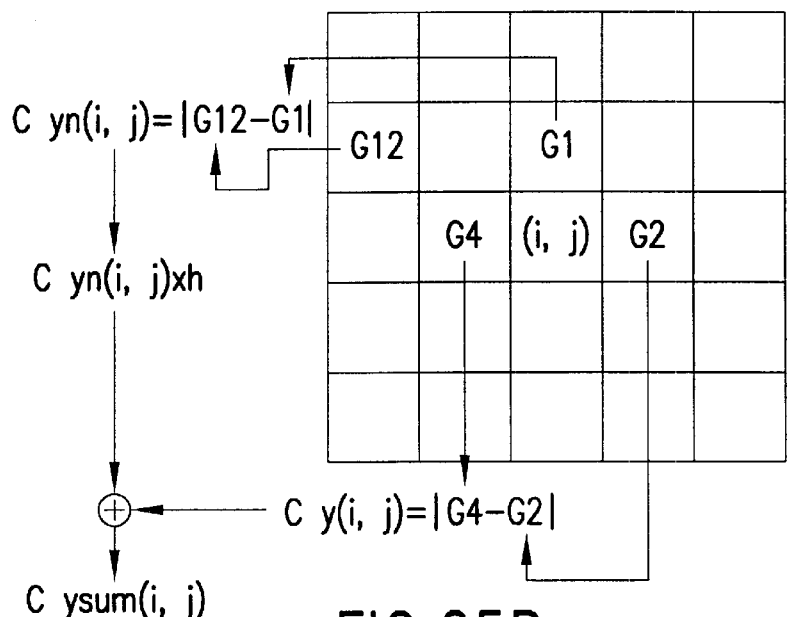

FIG. 23 is an operational flow chart of the eighth embodiment. FIG. 24 is an operation flow chart of the interpolation processing of the eighth embodiment. FIGS. 25A–25B explain a calculation method of a similarity of the eighth embodiment. Hereafter, the operation of the eighth embodiment is explained with reference to FIGS. 20–25.

When the main power is turned on, in the imaging element 123, the optical image which is supplied via the shooting optical system 121 and the OLPF 122 forms an image on the optical converting surface (not shown) of imaging element 123, and signal charges are formed by photoelectric conversion. The imaging element 123 forms the image signal by scanning the signal charges, and gives it to the A/D converter 124.

The A/D converter 124 converts the given image signal as stated above and forms the image data (step S61). In the present embodiment and each later mentioned embodiment, the image data corresponds to the pixel outputs that correspond to each pixel of the imaging element 123.

The image data formed as stated above is divided into the three colors of RGB, and stored in the areas in the image buffer memory 125 that correspond to each color (step S62). This kind of processing is repeatedly performed based on the timing control by the controller 120. The green image data (pixel outputs of the grid points and the interpolated amount of the empty grid points), as shown in FIG. 25, are stored in correlation with coordinates that are indicated by the above-mentioned coordinate system.

The controller 120 determines whether the release button (not shown) provided on the main body of the electronic still camera is pressed (step S63). When the controller 120 determines that the release button is not pressed by this kind of evaluation, it repeatedly orders the processing of the formation (step S61) and the storing (step S62) of the image data at the above-mentioned timing.

When the controller 120 determines that the release button is pressed, the later-mentioned execution of the interpolation processing by the interpolation processor 128 in the signal processor 126 is designated (step S64). In other words, in the present embodiment, the image data which is stored in the image buffer memory 125 becomes the object of the interpolation processing when the release button is pressed.

For performing the image display, it is also acceptable to constantly perform the interpolation processing, without regarding to when the release button is pressed. It is also acceptable to repeatedly perform the processing of step S61 and subsequent steps after the release button is pressed. The image data for which the interpolation processing is thus performed is stored in the image buffer memory 125 (step S65).

Hereafter, the operation of the interpolation processing according to the eighth embodiment is explained. The interpolation processor 128 selects the empty grid point which is to be interpolated when the execution of the interpolation processing is indicated by the controller 120 (step S71). For example, when [x+y=odd number] is established for the arbitrary coordinates (x, y), an empty grid point corresponds to these coordinates. Because of this, in the present embodiment, the coordinates that correspond to each pixel are retrieved in order from (1, 1) to (x__max, y__max), and the coordinates at which the sum of the x element and y element is an odd number are determined to be the empty grid points. When the empty grid point that is to be interpolated is selected, the interpolation processor 128, as described above, activates the first similarity calculator 129, the second similarity calculator 130, the empty grid point similarity calculator 131 and the interpolation amount calculator 132.

As shown in step S72, the first similarity calculator 129, using the pixel outputs G1, G2, G3 and G4, which are adjacent to the empty grid point (i, j), calculates the first vertical direction similarity Ct(i, j) as follows:

$$Ct(i, j) = |G1 - G3|,$$

and calculates the first horizontal direction similarity Cy(i, j) as follows:

$$Cy(i, j) = |G4 - G2|.$$

Then the second similarity calculator 130 calculates the second vertical direction similarity Ctn(i, j) and the second horizontal direction similarity Cyn(i, j) (step S73).

In other words, as shown in FIGS. 25A–25B, by using the pixel output G4 of the adjacent grid point in the left direction of the empty grid point (i, j) and the pixel output G5 of the pixel output of the grid point in the position that is shifted by two pixels in the upward direction from that grid point (i.e., G4), the second vertical direction similarity Ctn(i, j) is calculated as follows:

$$Ctn(i, j) = |G5 - G4|$$

In addition, the second similarity calculator 130, using the pixel output G1 of the adjacent grid point in the upper direction of the empty grid point (i, j) and the pixel output G12 of the pixel output of the grid points in the position that is shifted by two pixels in the left direction from that grid point (i.e., G1), calculates the second horizontal direction similarity Cyn(i, j) as follows:

$$Cyn(i, j) = |G12 - G1|.$$

The empty grid point similarity calculator 131, using the first vertical direction similarity Ct(i, j), the first horizontal direction similarity Cy(i, j), the second vertical direction similarity Ctn(i, j) and the second horizontal direction similarity Cyn(i, j), calculates the similarity Ctsum(i, j) in the vertical direction of the empty grid point and the similarity Cysum(i, j) in the horizontal direction of the empty grid point (step S74) as follows:

$$Ctsum(i, j) = Ct(i, j) + Ctn(i, j) \times h$$

$$Cysum(i, j) = Cy(i, j) + Cyn(i, j) \times h.$$

In other words, in the present embodiment, it becomes $$Ctsum(i, j) = |G1-G3| + |G5\,G4| \times h$$

$$Cysum(i, j) = |G4-G2| + |G12-G1| \times h.$$

In this example, h is a predetermined constant, and $0 < h \leq 2$.

When the similarity Ctsum(i, j) in the vertical direction of the empty grid point and the similarity Cysum(i, j) in the horizontal direction of the empty grid point are calculated, the interpolation calculator 132 calculates the interpolation amount G'(i, j) of the empty grid points as follows:

$$G'(i, j) = \{((G1 + G3) \times (1 + f(x)) + ((G4 + G2) \times (1 - f(x))\}/4. \quad \text{Eq. 1}$$

Where $$x = (Cysum(i, j) - Ctsum(i, j))/\{((Cysum(i, j) + Ctsum(i, j)) \times T1 + T0\},$$

and when $-1 \leq x \leq 1$, $f(x)=x$ when $x>1$, $f(x)=1$ when $x<-1$, $f(x)=-1$.

Here, T0 is a predetermined constant, and T1 is a constant that satisfies $0 \leq T1 \leq 1$, and at least one of T0 and T1 is not 0.

In the other words, the interpolation calculator 132 takes $x=(Cy\text{sum}(i, j)-Ct\text{sum}(i, j))/\{((Cy\text{sum}(i, j)+Ct\text{sum}(i, j))\times T1+T0\}$ as the evaluated value of the similarity of the empty grid point, and the interpolation amount of the empty grid point is calculated according to the evaluated value. Here, when x>0 is established, the similarity in the vertical direction is stronger than the similarity of the horizontal direction, and when x<0 is established, the similarity in the horizontal direction is stronger than the similarity in the vertical direction. The graph of f(x) has the shape shown in FIG. 26.

In equation 1, it is also acceptable to perform weighted addition using the values (2×G1) and/or (2×G3) for G1 and/or G3 instead of (G1+G3). In the same manner, it is also acceptable to perform weighted addition using the values (2×G2) and/or (2×G4) for G2 and/or G4 instead of (G4+G2).

Since Eq. 1 is f(x)=1 when x >1 is established, it is equivalent to $G'(i, j)=(G1+G3)/2$.

When x<-1 is established, f(x)=-1. Therefore, it is equivalent to $G'(i, j)=(G4+G2)/2$.

In other words, the interpolation amount calculator 132 determines whether the similarity of the grid points in the vertical direction stands out (is stronger) by determining whether x>1 is established (step S75), and determines whether the similarity in the horizontal direction of the grid points is strong by determining whether x<-1 is established (step S76).

When the similarity in the vertical direction of the grid points is strong (YES side of step S75), the interpolation amount calculator 132 takes the average value of the pixel outputs of the two grid points that are adjacent in the vertical direction as the interpolated amount of the empty grid point (step S77). When the similarity in the horizontal direction of the grid points is strong (YES side of step S76), the average value of the pixel outputs of the two grid points that are adjacent in the horizontal direction is taken as the interpolation amount of the empty grid point (step S78).

When $-1 \leq x \leq 1$ is established, Eq. 1 is equivalent to $G'(i, j) = \{(G1 + G3)/2\} \times \{(1 + x)/2\} + \{(G4 + G2)/2\} \times \{(1 - x)/2\}$ Here, (G1+G3)/2 corresponds to the average value of the pixel outputs of the two grid points that are adjacent in the vertical direction. (1+x)/2 corresponds to a weighting factor that corresponds to the similarity in the vertical direction. (G4+G2)/2 corresponds to the average value of the pixel outputs of the two grid points that are adjacent in the horizontal direction. (1-x)/2 corresponds to a weighting factor that corresponds to the similarity in the horizontal direction. In other words, when the interpolation amount calculator 132 determines that neither similarity stands out (NO side of step S76), the interpolation amount of the empty grid point is calculated by performing a weighted addition of the average value of the pixel outputs of the two grid points adjacent in the vertical direction of the empty grid point and the average value of the two grid points adjacent in the horizontal direction, based on the evaluated value of the similarity in each direction (step S79).

When the interpolation amount of the empty grid point is calculated as described above, the interpolation processor 128 determines whether the interpolation processing of all the empty grid points is finished (step S80). For example, this kind of evaluation corresponds to evaluating whether [i>X_max-3] and [j>Y_max-3] are established for the arbitrary coordinates (i, j) in the above-described process of searching the coordinates that correspond to each pixel.

In addition, for the portions for which the interpolation processing of the present invention cannot be easily adopted, such as the edge portions of the image, it is also appropriate to form a virtual image by folding back the image from the edge of the image according to well-known techniques.

The interpolation processor 128, by this kind of the evaluation, repeats the aforementioned processing (the processing after step S71) until it determines that all the empty grid points have been interpolated.

In other words, in the present embodiment, the similarity Ctsum(i, j) in the vertical direction of an empty grid point and the similarity Cysum(i, j) in the horizontal direction of the empty grid point can be easily calculated as follows:

$Ct\text{sum}(i, j)=|G1-G3|+|G5-G4|\times h$ $Cy\text{sum}(i, j)=|G4-G2|+|G12-G1|\times h$ Accordingly, in the present embodiment, the interpolation processing can be performed at high speed while reliably reflecting the similarity of an empty grid point.

In addition, since the similarity in the vertical direction and the similarity in the horizontal direction can be calculated, based on the image output of the grid points that are positioned in a comparatively narrow area, accurate interpolation processing can be performed even with respect to an image in which the variation is severe, and in which the similarity over a wide area is poor and in which similarity only appears over a narrow area.

When the interpolation processing of the empty grid point that outputs R34 is performed, the pixel outputs of the grid points in FIG. 22 became the following values as shown in FIG. 19: G1=1, G2=0, G3=1, G4=1, G5=1, G6=0, G7=0, G8=0, G9=0, G1=0, G11=1 and G12=1.

In this case, if h=1, the similarity Ctsum(i, j) in the vertical direction and the similarity Cysum(i, j) in the horizontal direction are, $Ct\text{sum}(i, j)=|G1-G3|+|G5-G4|\times h=0$ $Cy\text{sum}(i, j)=|G4-G2|+|G12-G1|\times h=1$.

In the other words, $x=(Cy\text{sum}(i, j)-Ct\text{sum}(i, j))/\{((Cy\text{sum}(i, j)+Ct\text{sum}(i, j))\times T1+T0\}=(1-0)/\{(1+0)\times T1+T0\}$.

Figure 26:
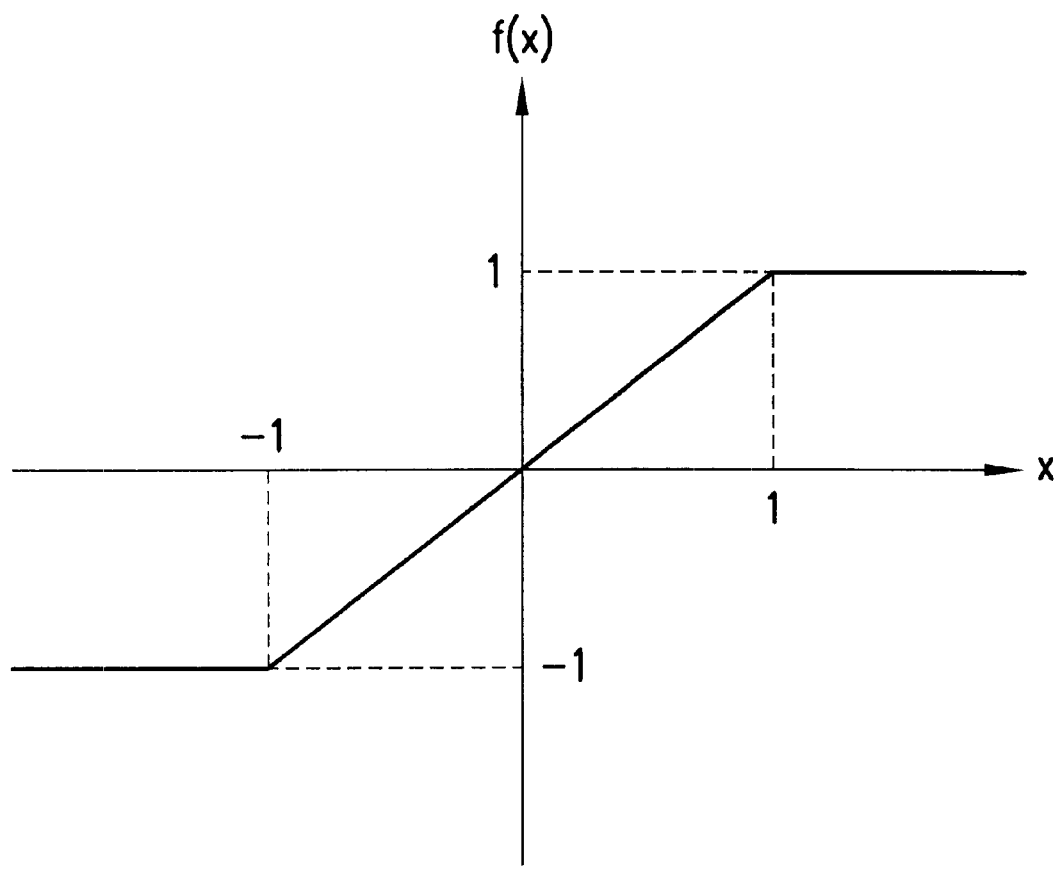
FIG. 26 is a diagram showing a shape of a graph of f(x)

Here, for example, when T1=0.5 and T0=0 are taken as the expected values with respect to an average image, $$x=2$$

and from the relation of FIG. 26, $$f(x)=1.$$

Accordingly, the interpolation amount G'(i, j) of the empty grid points is $$G'(i, j)=(G1+G3)/2=1$$

Accordingly, in the present embodiment, the interpolation processing can be performed with a high accuracy with respect to an image which has a possibility of collapsing by the conventional interpolating processing disclosed in U.S. Pat. No. 5,373,322.

In addition, the values of T1 and T0 can be determined by testing or the like of an average image. In the present embodiment, the second similarity calculator 130 calculates the second vertical direction similarity Ctn(i, j) by using G4 and G5 and calculates the second horizontal direction similarity Cyn(i, j) by using G1 and G12. However, it is also acceptable to calculate the second vertical direction similarity Ctn(i, j) by using any of $$Ctn(i, j)=|G6-G2|$$

$$Ctn(i, j)=|G9-G2|$$

$$Ctn(i, j)=|G10-G4|.$$

Also, it is acceptable to calculate the second horizontal direction similarity Cyn(i, j) by using any of $$Cyn(i, j)=|G7-G1|$$

$$Cyn(i, j)=|G3-G8|$$

$$Cyn(i, j)=|G11-G3|.$$

Further, it is also possible to calculate $$Ct(i-1, j-1)=|G5-G4|$$

$$Ct(i+1, j-1)=|G6-G2|$$

$$Ct(i+1, j+1)=|G9-G2|$$

$$Ct(i-1, j+1)=|G10-G4|$$

and to take the minimum value of these values as the second vertical direction similarity Ctn(i, j), and to calculate $$Cy(i-1, j-1)=|G12-G1|$$

$$Cy(i+1, j-1)=|G7-G1|$$

$$Cy(i+1, j+1)=|G3-G8|$$

$$Cy(i-1, j+1)=|G11-G3|,$$

and to take the minimum value of these values as the second horizontal direction similarity Cyn(i, j).

Moreover, in the present embodiment, h is $0<h \leq 2$, but h can be changed according to the values of the second vertical direction similarity Ctn(i, j) and the second horizontal direction similarity Cyn(i, j).

In the present embodiment, the similarity of G4 in the upper direction is the second vertical direction similarity Ctn(i, j), and the similarity of G1 in the left direction is the second horizontal direction similarity Cyn(i, j). The second vertical direction similarity Ctn(i, j) and the second horizontal direction similarity Cyn(i, j) are not obtained symmetrically for the empty grid point. In this case, it is also acceptable to decrease the influence of the second vertical direction similarity Ctn(i, j) and the second horizontal direction similarity Cyn(i, j) with respect to the similarity Ctsum(i, j) in the vertical direction of the empty grid point and the similarity Cysum(i, j) in the horizontal direction of the empty grid point by limiting h to 0.5<h<1.

Moreover, in the present embodiment, f(x) has a shape shown in FIG. 26, but as long as the average value of the image output of two grid points that are adjacent in the direction that stands out can be an interpolation amount when either one of the similarity Ctsum(i, j) in the vertical direction and the similarity (i, j) in the horizontal direction stands out, f(x) can be any kind of function.

Additionally, in the present embodiment, the value of f(x) is calculated at the time of the calculation of the interpolation amount. However, for example, it is also acceptable to obtain the value of f(x) by providing a lookup table in the interpolation amount calculator 132 that stores pre-calculated values of f(x), and then by referring to the lookup table according to the similarity Ctsum(i, j) in the vertical direction of the empty grid point and the similarity Cysum(i, j) in the horizontal direction.

Additionally, in the present embodiment, the determination of whether either one of the similarities stands out is performed based on the value of x. However, for example, it is acceptable to determine that the similarity Ctsum(i, j) in the vertical direction stands out when the similarity of Ctsum(i, j) in the vertical direction is less than a predetermined value (here, Th) and the similarity of Cysum(i, j) in the horizontal direction is more than Th, and to determine that the similarity Cysum(i, j) in the horizontal direction stands out when the similarity Cysum(i, j) in the horizontal direction is less than Th and the similarity Ctsum(i, j) in the vertical direction is more than Th.

Additionally, in order to avoid division when calculating x, it is acceptable to obtain x by calculating a value corresponding to the denominator and then switching the value with a value corresponding to 1/denominator using a reference table. It is also acceptable to switch to a method in which the difference of the logarithms of the absolute value of the numerator and the denominator are taken and then the size of this difference is compared with a predetermined value (in this case, the symbols are evaluated separately).

Furthermore, when the similarity Ctsum(i, j) in the vertical direction and the similarity Cysum(i, j) in the horizontal direction are close, the interpolation amount of the empty grid point can be determined based on the median of the pixel output of four grid points that are adjacent to the empty grid point.

Figure 27A:
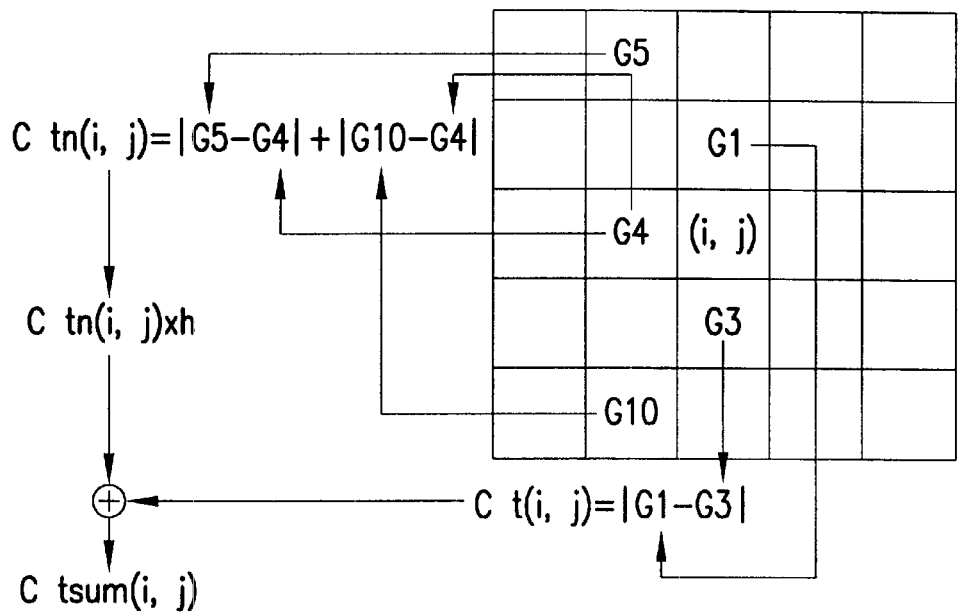
FIGS. 27A–27B explain a method of calculating similarity in a ninth embodiment.
Figure 27B:
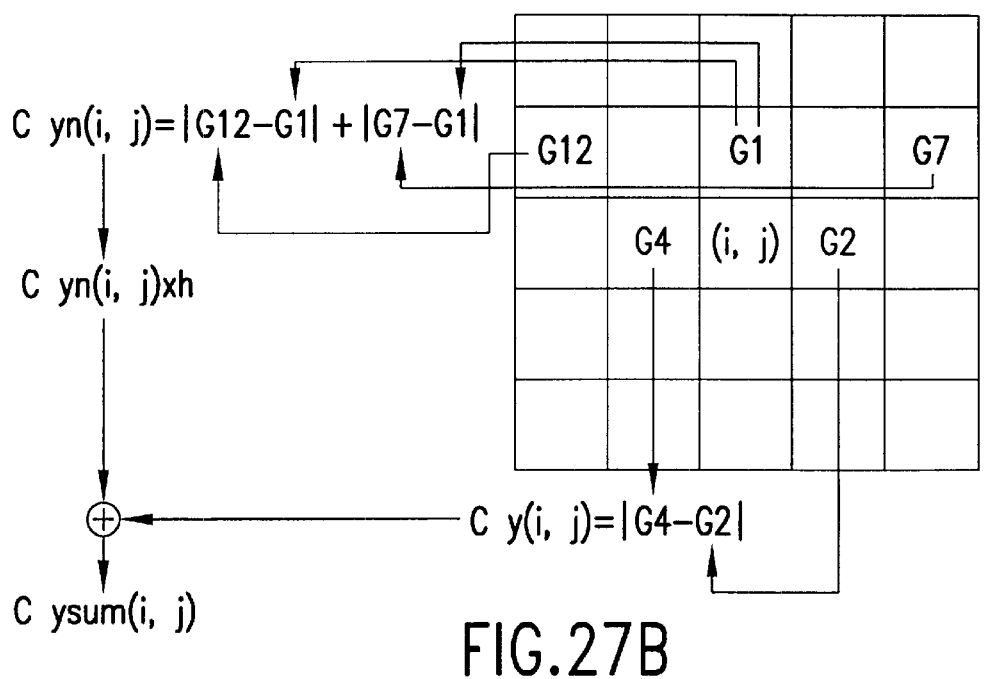

FIGS. 27A–27B explain a method of calculating the similarity in a ninth embodiment. The different characteristic of the ninth embodiment is in the method of calculating the second vertical direction similarity Ctn(i, j) and the second horizontal direction similarity Cyn(i, j), which are performed by the second similarity calculator 130. The descriptions of the other operations are omitted since they are similar to the eighth embodiment.

The second similarity calculator 130, as shown in FIGS. 27A–27B, uses G4, G5 and G10 to calculate the second vertical direction similarity Ctn(i, j), as follows:

$$Ctn(i, j)=|G5-G4|+|G10-G4|.$$

The second similarity calculator 130 uses G1, G12 and G7 to calculate the second horizontal direction similarity Cyn(i, j) as follows:

$$Cyn(i, j)=|G12-G1|+|G7-G1|$$

(A Variant of Step S73).

It is also acceptable to perform addition after performing weighting when performing this kind of calculation of the second vertical direction similarity Ctn(i, j) and the second horizontal direction similarity Cyn(i, j).

According to the ninth embodiment, the second vertical direction similarity can be obtained as the vertical direction similarity of G4, and the second horizontal direction similarity can be obtained as the horizontal direction similarity of G1. Because of this, the second vertical direction similarity and the second horizontal similarity can be obtained more accurately, as compared to the eighth embodiment in which the similarity in the upper direction of G4 is the second vertical direction similarity, and the similarity in the left direction of G1 is the second horizontal direction similarity.

Accordingly, in the ninth embodiment, the reliability of the interpolation processing can be improved while reflecting the similarity of the empty grid points.

Additionally, in the ninth embodiment, the second similarity calculator 130 calculates the second vertical direction similarity Ctn(i, j) by using G4, G5 and G10, and calculates the second horizontal direction similarity Cyn(i, j) by using G1, G7 and G12. However, for example, it is also acceptable to calculate the second vertical direction similarity Ctn(i, j) by the sum of any two values of |G5−G4|, |G6−G2|, |G9−G2| and |G10−G4|, and it is also acceptable to calculate the second horizontal direction similarity Cyn(i, j) by the sum of any two values of |G12−G11|, |G7−G1|, |G3−G8| and |G11−G3|.

Here, when calculating this kind of sum, it is acceptable to perform weighting of the two values. Further, the two smallest value items can be taken from $$Ct(i-1, j-1)=|G5-G4|$$
$$Ct(i+1, j-1)=|G6-G2|$$
$$Ct(i+1, j+1)=|G9-G2|$$
$$Ct(i-1, j+1)=|G10-G4|$$

and the values these two items can be added (or weight-added) together and the result taken as the second vertical direction similarity Ctn(i, j), and the two smallest values can be taken from $$Cy(i-1, j-1)=|G12-G1|$$
$$Cy(i+1, j-1)=|G7-G1|$$
$$Cy(i+1, j+1)=|G3-G8|$$
$$Cy(i-1, j+1)=|G11-G3|,$$

and the values of these two items can be added (or weight-added) together and the result taken as the second horizontal direction similarity Cyn(i, j).

Figure 28A:
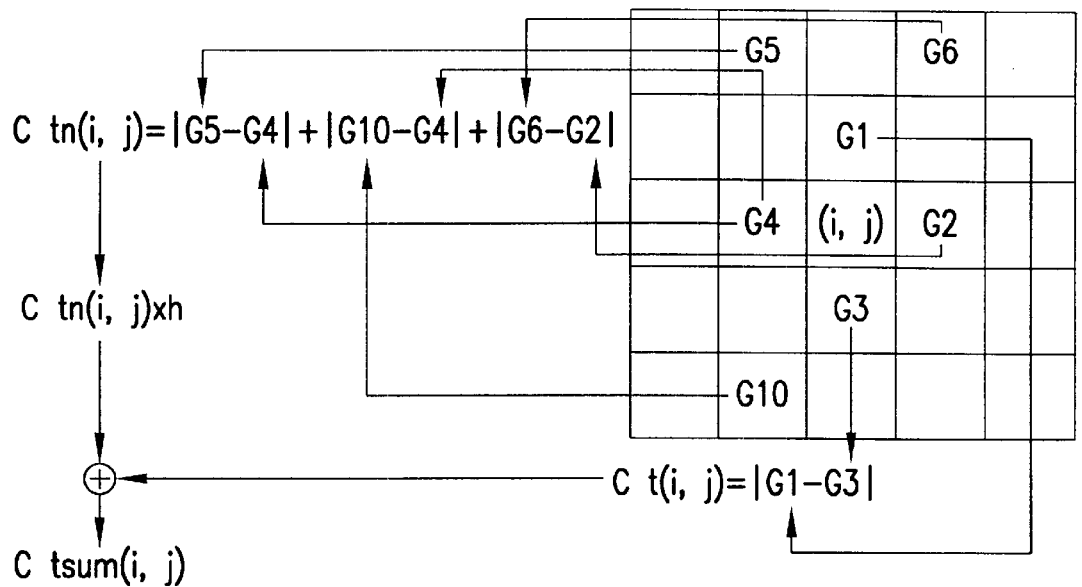
FIGS. 28A–28B explain a method of calculating similarity in a tenth embodiment.
Figure 28B:
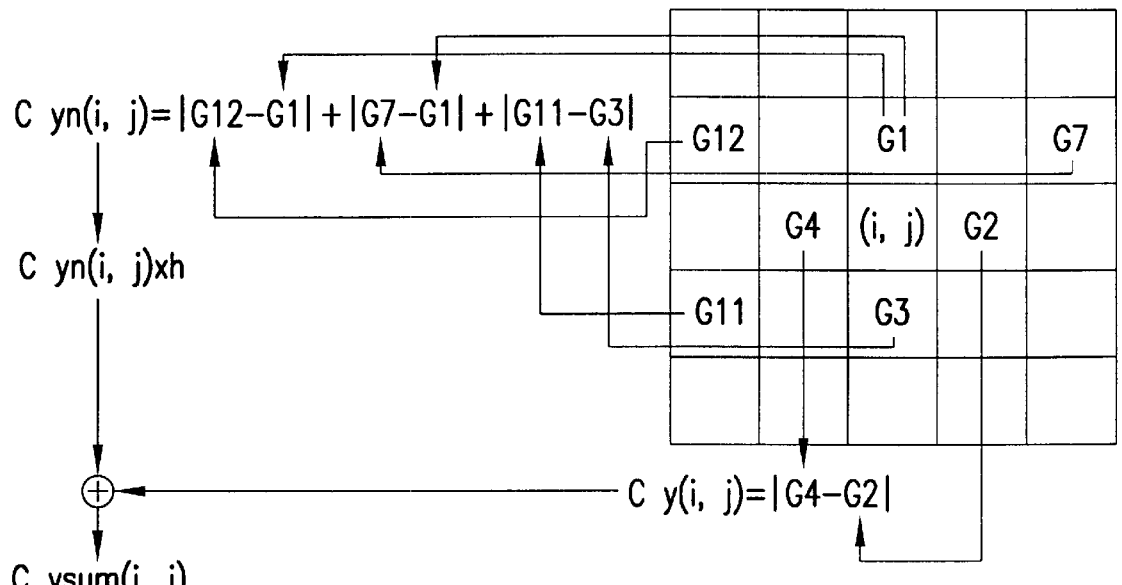

FIGS. 28A–28B explain a method of calculating the similarity of a tenth embodiment. The different characteristic of the tenth embodiment is in the method of calculating the second vertical direction similarity Ctn(i, j) and the second horizontal direction similarity Cyn(i, j), which are performed by the second similarity calculator 130. The descriptions of the other operations are omitted since they are similar to the eighth embodiment.

The second similarity calculator 130, as shown in FIGS. 28A–28B, uses G2, G4, G5, G6, and G10 to calculate the second vertical direction similarity Ctn(i, j) as follows:

$$Ctn(i, j)=|G5-G4|+|G10-G4|+|G6-G2|.$$

The second similarity calculator 130, uses G1, G3, G7, G11 and G12 to calculate the second horizontal direction similarity Cyn(i, j) as follows:

$$Cyn(i, j)=|G12-G1|+|G7-G1|+|G11-G3|$$

(A Variant of Step S73).

It is also acceptable to perform the addition after performing weighting at the time of calculating this kind of calculation of the second vertical direction similarity Ctn(i, j) and the second horizontal direction similarity Cyn(i, j).

In other words, according to the tenth embodiment, the second vertical direction similarity can be obtained as the sum of the vertical direction similarity of G4 and the similarity in the upper direction of G2, and the second horizontal direction similarity can be obtained as the sum of the horizontal direction similarity of G1 and the similarity in the left direction of G3.

Because of this, the second vertical direction similarity and the second horizontal direction similarity can be obtained more accurately compared to the eighth embodiment in which the similarity in the upper direction of G4 is the second vertical direction similarity, and the similarity in the left direction of G1 is the second horizontal direction similarity.

Accordingly, in the tenth embodiment, the reliability of the interpolation processing can be improved while reflecting the similarity of the empty grid point.

Additionally, in the present embodiment, the second similarity calculator 130 calculates the second vertical direction similarity Ctn(i, j) by using G2, G4, G5, G6 and G10, and calculates the second horizontal direction similarity Cyn(i, j) by using G1, G3, G7, G11 and G12. However, for example, it is also acceptable to calculate the second vertical direction similarity Ctn(i, j) by using the sum of any three values of |G5−G4|, |G6−G2|, |G9−G2| and |G10−G4|, and it is also acceptable to calculate the second horizontal direction similarity Cyn(i, j) by using the sum of any three values of |G12−G1|, |G7−G1|, |G3−G8| and |G11−G3|.

Here, when calculating this kind of sum, it is also acceptable to perform weighting of the two values. Further, the three smallest value items can be taken from $$Ct(i-1, j-1)=|G5-G4|$$
$$Ct(i+1, j-1)=|G6-G2|$$
$$Ct(i+1, j+1)=|G9-G2|$$
$$Ct(i-1, j+1)=|G10-G4|$$

and the values of these three items can be added (or weight-added) together and the result taken as the second vertical direction similarity Ctn(i, j), and the three smallest values can be taken from $$Cy(i-1, j-1)=|G12-G1|$$
$$Cy(i+1, j-1)=|G7-G1|$$
$$Cy(i+1, j+1)=|G3-G8|$$
$$Cy(i-1, j+1)=|G11-G3|$$

and the values of these three items can be added (or weight-added) together and the result taken as the second horizontal direction similarity Cyn(i, j).

Figure 29A:
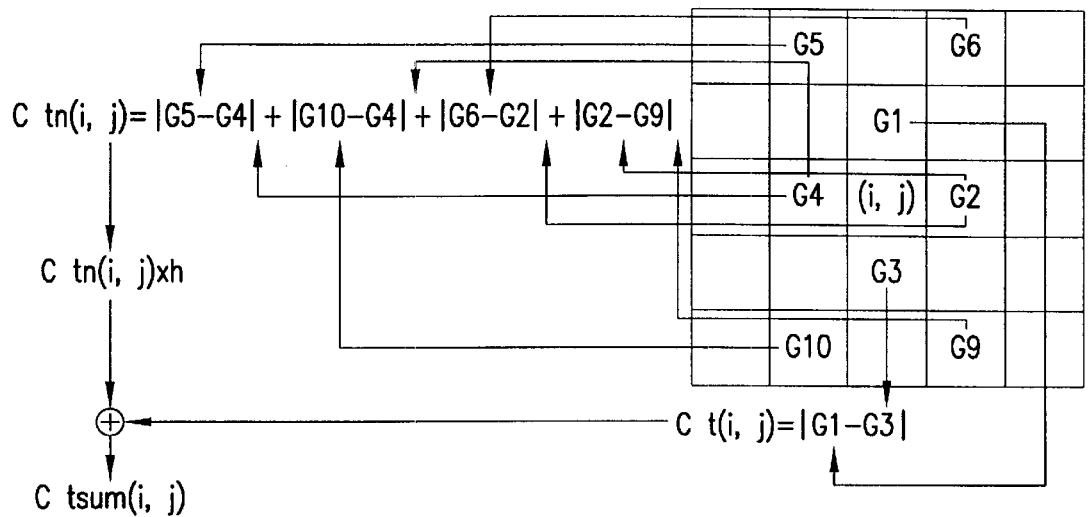
FIGS. 29A–29B explain a method of calculating similarity in an eleventh embodiment.
Figure 29B:
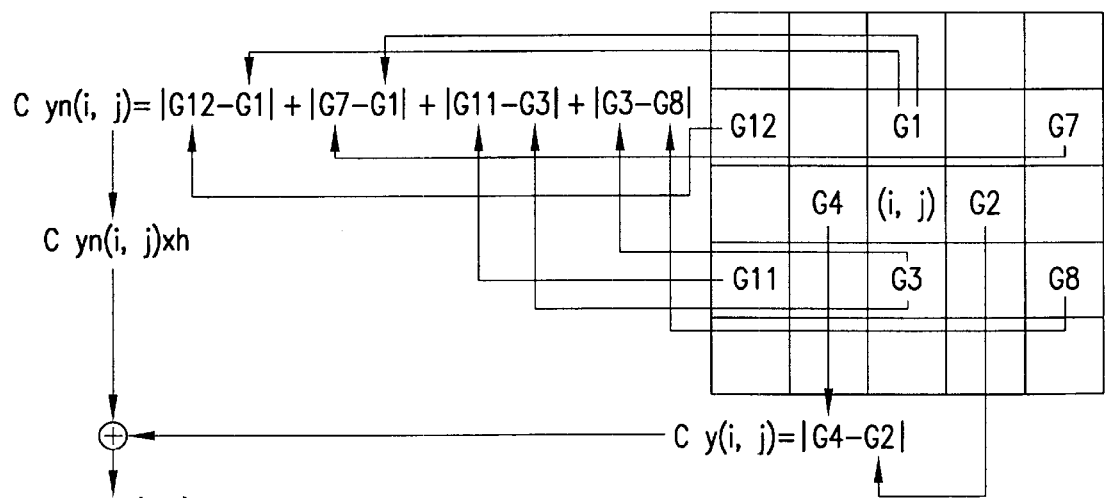

FIGS. 29A–29B explain a method of calculating the similarity of an eleventh embodiment. The different characteristic of the eleventh embodiment is in the method of calculating the second vertical direction similarity Ctn(i, j) and the second horizontal direction similarity Cyn(i, j) which are performed by the second similarity calculator 130. The descriptions of the other operations are omitted since they are similar to the first embodiment.

The second similarity calculator 130, as shown in FIGS. 29A and 29B, uses G2, G4, G5, G6, G9 and G10 to calculate the second vertical direction similarity Ctn(i, j) as follows:

$$Ctn(i, j) = |G5 - G4| + |G6 - G2| + |G9 - G2| + |G10 - G4|.$$

The second similarity calculator 130 uses G1, G3, G7, G8, G11 and G12 to calculate the second horizontal direction similarity Cyn(i, j) as follows:

$$Cyn(i, j) = |G12 - G1| + |G7 - G1| + |G3 - G8| + |G11 - G3|$$

(A Variant of Step S73).

It is also acceptable to perform the addition after performing weighting at the time of calculating this kind of calculation of the second vertical direction similarity Ctn(i, j) and the second horizontal direction similarity Cyn(i, j).

In other words, according to the eleventh embodiment, the second vertical direction similarity can be obtained as the similarity in the vertical direction of G4 and G2, and the second horizontal direction similarity can be obtained as the similarity in the horizontal direction of G1 and G3.

Because of this, the second vertical direction similarity and the second horizontal similarity can be obtained symmetrically for the empty grid points and accuracy of the second vertical direction similarity and the second horizontal similarity are improved, as compared to the eighth embodiment, in which the similarity in the upper direction of G4 is the second vertical direction similarity, and the similarity of the left direction of G1 is the second horizontal direction similarity.

Accordingly, in the eleventh embodiment, the reliability of the interpolation processing can be improved while reflecting the similarity of the empty grid point.

If the present invention uses an imaging element having the structure where the grid points and empty grid points are arrayed in a checkered pattern, it is applicable regardless of whether it uses a single plate, multiple plates, or a color filter. As shown in FIG. 17A, it is also applicable to an imaging element that is not arranged in a checkered pattern.

For example, in FIG. 17A, when the center part of the pixel outputs of four green color (G) is taken as an imaginary empty grid point, by rotating the imaging elements shown in FIG. 17A by 45 degrees, it can be said that the grid points are arrayed in the four directions of above, below, right, and left of the empty grid point. Because of this, just like in each embodiment described above, it is possible to calculate the interpolation amount of the empty grid point.

In each of the eighth-eleventh embodiments described above, the interpolation processing is performed by providing the interpolation processor 128 within an electronic still camera. However, this kind of interpolation processing can be also performed by an image processing device and a computer.

Figure 30:
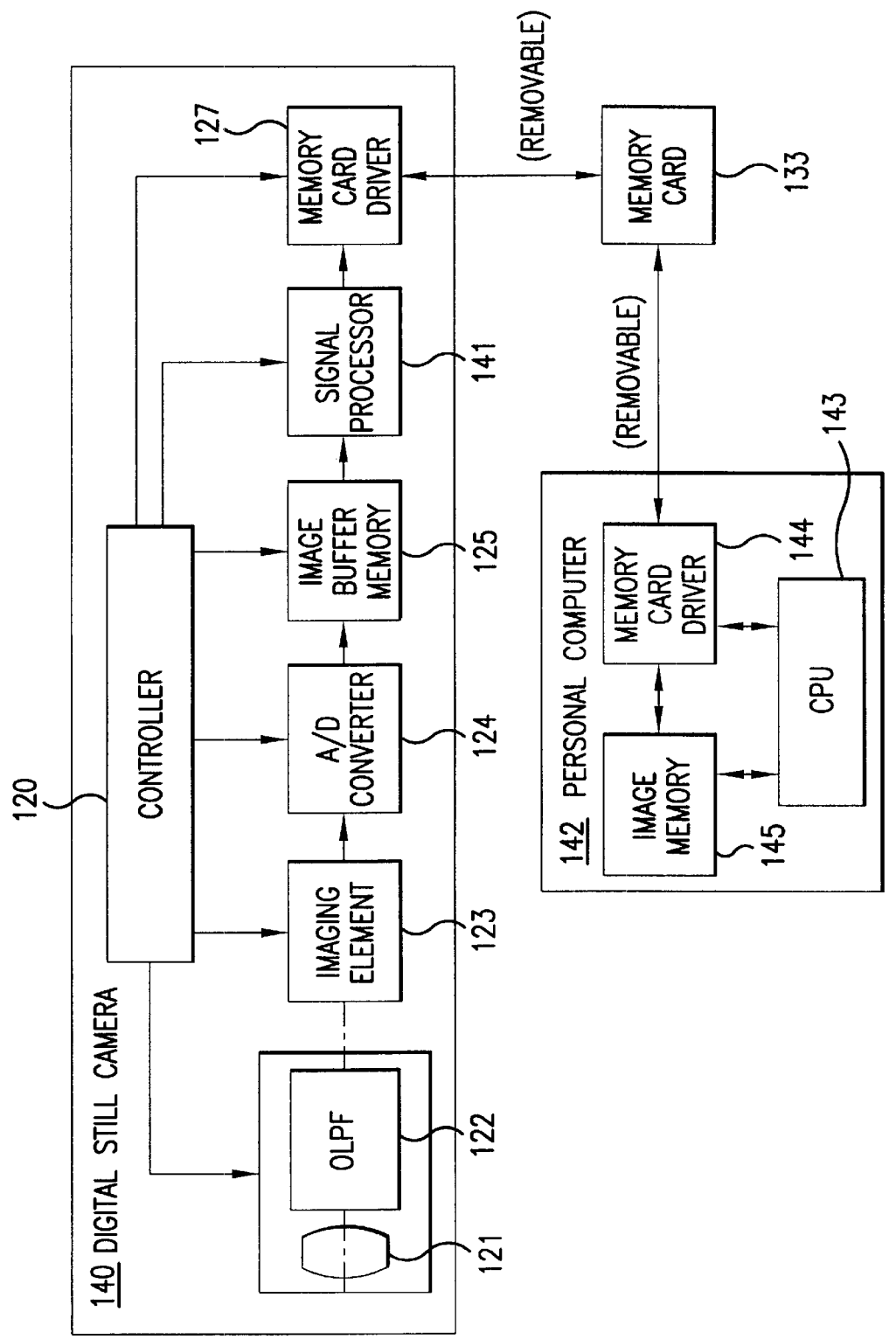
FIG. 30 is a block diagram of a twelfth embodiment.

FIG. 30 is a block diagram of a twelfth embodiment. In FIG. 30, when the function is the same as the block diagram shown in FIG. 20, the same symbols are used and the explanation of such structure is omitted.

The difference of the structure between the electronic still camera 140 shown in FIG. 30 and the embodiment shown in FIG. 20 is that the signal processor 141 is provided instead of the signal processor 126, a memory card driver 127 is provided, the output of the image buffer memory 125 is connected to the signal processor 141 and the output of the signal processor 141 is connected to the memory card driver 127.

In FIG. 30, the personal computer 142 has CPU 143, a memory card driver 144, and an image buffer memory 145. CPU 143 is connected to the memory card driver 144 and the image buffer memory 145, and the memory card driver 144 and the image buffer memory 145 are connected to each other.

In CPU 143, an interpolation processing program that implements the same interpolation processing as described for embodiments 8–11 is installed in advance.

The flow charts of FIGS. 15A and 15B are also applicable to the twelfth embodiment. The following explains the operation of the twelfth embodiment with reference to FIGS. 30 and 15A–B. In the electronic still camera 140, signal charges are formed on imaging element 123 just like in the eighth embodiment. Furthermore, the imaging element 123 forms an image signal by scanning the signal charges which are thus formed and provides it to the A/D converter 124. The A/D converter 124 A/D converts the image signal which is thus given and forms image data (step S51). The image data which is thus formed is temporarily stored in the image buffer memory 125 (step S52). This type of process is repeatedly performed based upon the timing control by the controller 120.

The controller 120 determines whether or not the release button (not depicted) has been pressed (step S53), and when it recognizes that the release button has been pressed, it instructs the signal processor 141 and the memory card driver 127 to record the image data stored in the image buffer memory 125 to the memory card 133 (step S54).

In the signal processor 141, the adjustment of the imaging element output (for example, dark level or the like) and processing such as γ correction are performed to the image data stored in the image buffer memory 125 (the interpolation processing is not performed here) and the image data is given to the memory card driver 127. The γ correction can be performed in the personal computer 142 instead of being performed in the signal processor 141.

Furthermore, the signal processor 141 outputs information which shows that the image data needs interpolation processing to the memory card driver 127. The memory card driver 127 records the image data to the memory card 132 in the form of an image file and simultaneously sets an interpolation request flag (a flag showing that the image data needs interpolation processing) that is provided in the header part of the image file.

When the memory card 133 in which the image data is thus recorded is loaded into the personal computer 142, CPU 143 reads the header part of the image file through the memory card driver 144 (step S55). When CPU 143 thus reads the header part of the image file, it determines whether or not the interpolation request flag is set (step S56).

Only when CPU 143 recognizes that the interpolation request flag is set by this kind of determination, the image data is read through the memory card driver 144 and is stored in the image buffer memory 145 (step S57).

Furthermore, CPU 143 performs the interpolation processing to the image data which is stored in the image memory 145, and stores it in the image memory 145 (step S58). The interpolation processing of the present embodiment is the same as the interpolation processing of embodiments 8–11 described above, so its explanation is omitted.

At the point when the interpolation processing is completed, the CPU 143 records the image data to which the interpolation processing has been performed to the memory card 133 via the memory card driver 144 (step S59). It can be selected by the operator by an input device of the personal computer 142 (for example the keyboard or the like) whether the image data to which the interpolation processing is performed will be recorded in the memory card 133.

That is, in the present embodiment, the electronic still camera 140 can record the image data to which the interpolation processing is not performed and which has a small recording capacity, and interpolation processing which is the same as in the various embodiments described above can be performed by the personal computer 142 as required by the operator.

Therefore, according to the present embodiment, it is possible to efficiently use the memory card 133 at the time of shooting, and to accurately perform interpolation processing through the personal computer 142.

Furthermore, in the present embodiment, the personal computer 142 obtains the image data in which the interpolation processing is to be performed through the memory card 133, but any method can be used for the method of obtaining the image data. For example, when applying the present invention to a personal computer with a communication means (as detailed earlier), it is also possible to perform the interpolation processing to image data which is given through the communication means.

Additionally, as noted with respect to the seventh embodiment, the recording medium can be, for example, a CD-ROM or a carrier wave.

In the illustrated embodiments, the controller (processor 47, 53 128 or CPU 63, 143) is implemented using a suitably programmed general purpose computer, e.g., a microprocessor, microcontroller or other processor device (CPU or MPU). It will be appreciated by those skilled in the art, that the controller can also be implemented as a single special purpose integrated circuit (e.g., ASIC) having a main or central processor section for overall, system-level control, and separate sections dedicated to performing various different specific computations, functions and other processes under control of the central processor section. The controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer in conjunction with one or more peripheral (e.g., integrated circuit) data and signal processing devices. In general, any device or assembly of devices on which a finite state machine capable of implementing the flow charts shown in FIGS. 3, 4, 8, 11, 13, 15A–15B, 23 or 24 can be used as the controller.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An interpolation device for performing interpolation of an image in which grid points that output a predetermined color and empty grid points that do not output the predetermined color are oriented in a checkered pattern to obtain an interpolation amount that becomes a pixel output of the empty grid point, comprising:

a first similarity calculator that calculates a first vertical direction similarity indicative of a similarity of two grid points adjacent to an empty grid point in a vertical direction and a first horizontal direction similarity indicative of a similarity of two grid points adjacent to the empty grid point in a horizontal direction;

a second similarity calculator that calculates a second vertical direction similarity indicative of a similarity of at least one of the grid points adjacent to the empty grid point in the horizontal direction and a second horizontal direction similarity indicative of a similarity of at least one of the grid points adjacent to the empty grid point in the vertical direction;

a similarity calculator that calculates a similarity in a vertical direction of the empty grid point based on the first vertical direction similarity and the second vertical direction similarity and calculates a similarity in a horizontal direction of the empty grid point based on the first horizontal direction similarity and the second horizontal direction similarity; and an interpolation calculator that calculates an interpolation amount of the empty grid points by one of:
  selecting at least one pixel output of grid points positioned in a direction where the similarity determined by the similarity calculator is strong, and
  by weighted addition of at least one pixel output of the grid points positioned at the vertical direction and at least one pixel output of the grid points positioned at the horizontal direction, according to the similarity determined by the similarity calculator.

2. The interpolation device of claim 1, wherein when the coordinates of the empty grid point are (i, j), the first similarity calculator calculates the first vertical direction similarity Ct(i, j) and the first horizontal direction similarity Cy(i, j) as follows:

$$Ct(i, j)=|G(i, j-1)-G(i, j+1)|$$

$$Cy(i, j)=|G(i-1, j)-G(i+1, j)|,$$

wherein G(x, y) is the pixel output of a grid point that is positioned at the coordinates (x, y).

3. The interpolation device of claim 2, wherein, the second similarity calculator calculates the second vertical direction similarity Ctn(i, j) based on at least one of Ct(i−1, j−1), Ct(i+1, j−1), Ct(i+1, j+1) and Ct(i−1, j+1), and calculates the second horizontal direction similarity Cyn(i, j) based on at least one of Cy(i−1, j−1), Cy(i+1, j−1), Cy(i+1, j+1) and Cy(i−1, j+1).

4. The interpolation device of claim 3, wherein the second similarity calculator designates a sum of two of the values among Ct(i−1, j−1), Ct(i+1, j−1), Ct(i+1, j+1) and Ct(i−1, j+1) as the second vertical direction similarity Ctn(i, j), and designates a sum of two of the values among Cy(i−1, j−1), Cy(i+1, j−1), Cy(i+1, j+1) and Cy(i−1, j+1) as the second horizontal direction similarity Cyn(i, j).

5. The interpolation device of claim 3, wherein the second similarity calculator designates a weighted addition of two of the values among Ct(i−1, j−1), Ct(i+1, j−1), Ct(i+1, j+1) and Ct(i−1, j+1) as the second vertical direction similarity Ctn(i, j), and designates a weighted addition of two of the values among Cy(i−1, j−1), Cy(i+1, j−1), Cy(i+1, j+1) and Cy(i−1, j+1) as the second horizontal direction similarity Cyn(i, j).

6. The interpolation device of claim 3, wherein the second similarity calculator designates a minimum value among Ct(i−1, j−1), Ct(i+1, j−1), Ct(i+1, j+1), and Ct(i−1, j+1) as the second vertical direction similarity Ctn(i, j), and designates a minimum value among Cy(i−1, j−1), Cy(i+1, j−1), Cy(i+1, j+1) and Cy(i−1, j+1) as the second horizontal direction similarity Cyn(i, j).

7. The interpolation device of claim 3, wherein the second similarity calculator calculates the second vertical direction similarity Ctn(i, j) based on two values taken in order from the smallest value among Ct(i−1, j−1), Ct(i+1, j−1), Ct(i+1, j+1) and Ct(i−1, j+1), and calculates the second horizontal direction similarity Cyn(i, j) based on two values taken in order from the smallest value among Cy(i−1, j−1), Cy(i+1, j−1), Cy(i+1, j+1) and Cy(i−1, j+1).

8. The interpolation device of claim 3, wherein the second similarity calculator takes all possible groups of three values among Ct(i−1, j−1), Ct(i+1, j−1), Ct(i+1, j+1) and Ct(i−1, j+1), calculates a sum of the three values of each group, and designates a minimum value thereof as the second vertical direction similarity Ctn(i, j), and takes all possible groups of three values among Cy(i−1, j−1), Cy(i+1, j−1), Cy(i+1, j+1) and Cy(i−1, j+1), calculates a sum of each group, and designates a minimum value thereof as the second horizontal direction similarity Cyn(i, j).

9. The interpolation device of claim 3, wherein the second similarity calculator takes all possible groups of three values among Ct(i−1, j−1), Ct(i+1, j−1), Ct(i+1, j+1) and Ct(i−1, j+1), calculates a weighted sum of three values of each group, and designates a minimum value thereof as the second vertical direction similarity Ctn(i, j), and takes all the possible groups of three values among Cy(i−1, j−1), Cy(i+1, j−1), Cy(i+1, j+1) and Cy(i−1, j+1), calculates a weighted sum of each group, and designates a minimum value thereof as the second horizontal direction similarity Cyn(i, j).

10. The interpolation device of claim 1, wherein, when the coordinates of the empty grid point are (i, j), the first vertical direction similarity is Ct(i, j), the second vertical direction similarity is Ctn(i, j), the first horizontal direction similarity is Cy(i, j) and the second horizontal direction similarity is Cyn(i, j), the similarity calculator determines the similarity Ctsum(i, j) in the vertical direction of the empty grid points and the similarity Cysum(i, j) in the horizontal direction of the empty grid points as follows:

$$Ctsum(i, j)=Ct(i, j)+Ctn(i, j) \times h$$

$$Cysum(i, j)=Cy(i, j)+Cyn(i, j) \times h$$

wherein h is a predetermined constant.

11. The interpolation device of claim 1, wherein the interpolation amount calculator designates an average value of the pixel output of two grid points adjacent in the direction of strong similarity as the interpolation amount of the empty grid point when either one of the vertical direction similarities and the horizontal direction similarities of the grid points determined by the similarity calculator is determined to be strong, and calculates the interpolation amount of the empty grid point by a method other than calculating the average value when both the similarities are substantially equal.

12. The interpolation device of claim 11, wherein the interpolation amount calculator calculates the interpolation amount of the empty grid point based on a weighting factor corresponding to each similarity when the similarities in the vertical and horizontal directions of the empty grid point determined by the similarity calculator are substantially equal.

13. The interpolation device of claim 12, wherein when the coordinates of the empty grid point are (i, j), the similarity in the vertical direction of the empty grid point is Ctsum(i, j), and the similarity in the horizontal direction of the empty grid point is Cysum(i, j), the interpolation amount calculator calculates the interpolation amount G'(i, j) of the empty grid point as follows:

$$G'(i, j)=\{(G(i, j-1)+G(i, j+1))\times(1+f(x))+(G(i-1, j)+G(i+1, j))\times(1-f(x))\}/4$$

$$x=(Cysum(i, j)-Ctsum(i, j))/\{(Cysum(i, j)+Ctsum(i, j))\times T1+T0\}$$

when $$-1 \leq x \leq 1, f(x)=x$$

when $$x>1, f(x)=1$$

when $$x<-1, f(x)=-1,$$

wherein T1 and T0 are predetermined constants, both of which are not 0, and G(x, y) is the pixel output of a grid point positioned at the coordinates (x, y).

14. The interpolation device of claim 11, wherein the interpolation amount calculator calculates the interpolation amount of the empty grid point by calculating the median of the pixel outputs of four grid points adjacent to the empty grid point when the similarities in the vertical and horizontal directions of the empty grid point determined by the similarity calculator are substantially equal.

15. A recording medium in which is recorded a computer readable interpolation program for use by a computer in performing interpolation of an image in which grid points that output a predetermined color and empty grid points that do not output the predetermined color are oriented in a checkered configuration to obtain an interpolation amount that becomes a pixel output of the empty grid points, the program comprising:

a first similarity calculation procedure for calculating a first vertical direction similarity indicative of a similarity of two grid points adjacent to an empty grid point in a vertical direction and a first horizontal direction similarity indicative of a similarity of two grid points adjacent to the empty grid point in a horizontal direction;

a second similarity calculation procedure for calculating a second vertical direction similarity indicative of a similarity of at least one of the grid points adjacent to the empty grid point in the horizontal direction and a second horizontal direction similarity indicative of a similarity of at least one of the grid points adjacent to the empty grid point in the vertical direction;

a similarity calculation procedure for calculating a similarity in a vertical direction of the empty grid point based on the first vertical direction similarity and the second vertical direction similarity and for calculating a similarity in a horizontal direction of the empty grid point based on the first horizontal direction similarity and the second horizontal direction similarity; and an interpolation calculation procedure for calculating an interpolation amount of the empty grid points by one of:
  selecting at least one pixel output of grid points positioned in a direction where the similarity determined by the similarity calculation procedure is strong, and
  by weighted addition of at least one pixel output of the grid points positioned at the vertical direction and at least one pixel output of the grid points positioned at the horizontal direction, according to the similarity determined by the similarity calculation procedure.

16. The recording medium of claim 15, wherein when the coordinates of the empty grid point are (i, j), the first similarity calculation procedure calculates the first vertical direction similarity Ct(i, j) and the first horizontal direction similarity Cy(i, j) as follows:

$$Ct(i, j)=|G(i, j-1)-G(i, j+1)|$$

$$Cy(i, j)=|G(i-1, j)-G(i+1, j)|,$$

wherein G(x, y) is the pixel output of a grid point that is positioned at the coordinates (x, y).

17. The recording medium of claim 16, wherein the second similarity calculation procedure calculates the second vertical direction similarity Ctn(i, j) based on at least one of Ct(i−1, j−1), Ct(i+1, j−1), Ct(i+1, j+1) and Ct(i−1, j+1), and calculates the second horizontal direction similarity Cyn(i, j) based on at least one of Cy(i−1, j−1), Cy(i+1, j−1), Cy(i+1, j+1) and Cy(i 1, j+1).

18. The recording medium of claim 17, wherein the second similarity calculation procedure designates a sum of two of the values among Ct(i−1, j−1), Ct(i+1, j−1), Ct(i+1, j+1) and Ct(i−1, j+1) as the second vertical direction similarity Ctn(i, j), and designates a sum of two of the values among Cy(i−1, j−1), Cy(i+1, j−1), Cy(i+1, j+1) and Cy(i−1, j+1) as the second horizontal direction similarity Cyn(i, j).

19. The recording medium of claim 17, wherein the second similarity calculation procedure designates a weighted addition of two of the values among Ct(i−1, j−1), Ct(i+1, j−1), Ct(i+1, j+1) and Ct(i−1, j+1) as the second vertical direction similarity Ctn(i, j), and designates a weighted addition of two of the values among Cy(i−1, j−1), Cy(i+1, j−1), Cy(i+1, j+1) and Cy(i−1, j+1) as the second horizontal direction similarity Cyn(i, j).

20. The recording medium of claim 15, wherein, when the coordinates of the empty grid point are (i, j), the first vertical direction similarity is Ct(i, j), the second vertical direction similarity is Ctn(i, j), the first horizontal direction similarity is Cy(i, j) and the second horizontal direction similarity is Cyn(i, j), the similarity calculation procedure determines the similarity Ctsum(i, j) in the vertical direction of the empty grid points and the similarity Cysum(i, j) in the horizontal direction of the empty grid points as follows:

$$Ctsum(i, j)=Ct(i, j)+Ctn(i, j)\times h$$

$$Cysum(i, j)=Cy(i, j)+Cyn(i, j)\times h$$

wherein h is a predetermined constant.

21. The recording medium of claim 15, wherein the interpolation amount calculation procedure designates an average value of the pixel output of two grid points adjacent in the direction of strong similarity as the interpolation amount of the empty grid point when either one of the vertical direction similarities and the horizontal direction similarities of the grid points determined by the similarity calculation procedure is determined to be strong, and calculates the interpolation amount of the empty grid point by a method other than calculating the average value when both the similarities are substantially equal.

22. The recording medium of claim 21, wherein the interpolation amount calculation procedure calculates the interpolation amount of the empty grid point based on a weighting factor corresponding to each similarity when the similarities in the vertical and horizontal directions of the empty grid point determined by the similarity detection procedure are substantially equal.

23. The recording medium of claim 22, wherein when the coordinates of the empty grid point are (i, j), the similarity in the vertical direction of the empty grid point is Ctsum(i, j), and the similarity in the horizontal direction of the empty grid point is Cysum(i, j), the interpolation amount calculation procedure calculates the interpolation amount G'(i, j) of the empty grid point as follows:

$$G'(i, j)=\{(G(i, j-1)+G(i, j+1))\times(1+f(x))+(G(i-1, j)+G(i+1, j)\times(1-f(x))\}/4$$

$$x=(Cysum(i, j)-Ctsum(i, j))/\{(Cysum(i, j)+Ctsum(i, j))\times T1+T0\}$$

when $$-1\leq x\leq 1, f(x)=x$$

when $$x>1, f(x)=1$$

when $$x<-1, f(x)=-1,$$

wherein T1 and T0 are predetermined constants, both of which are not 0, and G(x, y) is the pixel output of a grid point positioned at the coordinates (x, y).

24. The recording medium of claim 21, wherein the interpolation amount calculation procedure calculates the interpolation amount of the empty grid point by calculating the median of the pixel outputs of four grid points adjacent to the empty grid point when the similarities in the vertical and horizontal directions of the empty grid point determined by the similarity calculation procedure are substantially equal.

* * * * *